(12) United States Patent
Hart et al.

(10) Patent No.: US 9,706,028 B1
(45) Date of Patent: Jul. 11, 2017

(54) PROTECTING DEVICES FROM IMPACT DAMAGE

(75) Inventors: Gregory M. Hart, Mercer Island, WA (US); Jeffrey P. Bezos, Greater Seattle Area, WA (US)

(73) Assignee: Amazon Technologies, Inc., Reno, NV (US)

( * ) Notice: Subject to any disclaimer, the term of this patent is extended or adjusted under 35 U.S.C. 154(b) by 1040 days.

(21) Appl. No.: 13/621,129

(22) Filed: Sep. 15, 2012

Related U.S. Application Data

(63) Continuation of application No. 12/703,919, filed on Feb. 11, 2010, now Pat. No. 8,330,305.

(51) Int. Cl.
 *H04M 1/18* (2006.01)

(52) U.S. Cl.
 CPC ........ *H04M 1/185* (2013.01); *H04M 2250/12* (2013.01)

(58) Field of Classification Search
 CPC ... H04M 1/185; H04M 2250/12; H01H 35/14
 See application file for complete search history.

(56) References Cited

U.S. PATENT DOCUMENTS

| | | | | |
|---|---|---|---|---|
| 5,765,778 A | * | 6/1998 | Otsuka | B64C 25/56 244/100 A |
| 6,520,013 B1 | * | 2/2003 | Wehrenberg | G11B 19/04 360/75 |
| 7,017,195 B2 | | 3/2006 | Buckman et al. | |
| 7,059,182 B1 | * | 6/2006 | Ragner | H05K 5/0086 73/200 |
| 7,369,345 B1 | * | 5/2008 | Li | G11B 5/5582 360/73.03 |
| 7,450,332 B2 | * | 11/2008 | Pasolini | G01P 15/0891 360/69 |
| 7,549,335 B2 | * | 6/2009 | Inoue | G01P 3/22 360/75 |
| 7,609,479 B2 | | 10/2009 | Sasaki et al. | |
| 7,924,552 B2 | * | 4/2011 | Tseng | H04M 1/185 280/252 |
| 8,330,305 B2 | | 12/2012 | Hart et al. | |
| 2004/0003455 A1 | * | 1/2004 | Davidson | A61F 5/028 2/455 |

(Continued)

FOREIGN PATENT DOCUMENTS

| | | |
|---|---|---|
| CN | 1791312 | 6/2006 |
| CN | 201282501 | 7/2009 |

(Continued)

OTHER PUBLICATIONS

"Non Final Office Action dated May 2, 2012", U.S. Appl. No. 12/703,919, 10 pages.

(Continued)

*Primary Examiner* — Thienvu Tran
*Assistant Examiner* — Pingping Sun
(74) *Attorney, Agent, or Firm* — Polsinelli LLP

(57) ABSTRACT

A system and method for protecting devices from impact damage is provided. Prior to impact between a surface and a device, a determination of a risk of damage to the device is made. If the risk of damage to the device exceeds a threshold, a protection system is activated to reduce or substantially eliminate damage to the device.

20 Claims, 18 Drawing Sheets

(56) References Cited

U.S. PATENT DOCUMENTS

| | | | | |
|---|---|---|---|---|
| 2006/0070439 | A1* | 4/2006 | Kwon | G01P 15/00 73/488 |
| 2008/0085706 | A1* | 4/2008 | Nagata | G06F 21/88 455/435.1 |
| 2009/0159408 | A1* | 6/2009 | Sunder | G11B 19/043 200/61.45 R |
| 2009/0219130 | A1 | 9/2009 | Dai et al. | |
| 2009/0254003 | A1* | 10/2009 | Buckman | A61B 5/1117 600/595 |
| 2010/0157515 | A1 | 6/2010 | Tseng | |

FOREIGN PATENT DOCUMENTS

| | | |
|---|---|---|
| EP | 2534551 | 12/2012 |
| JP | 2002-247153 A | 8/2002 |
| JP | 2007-158694 | 6/2007 |
| JP | 2007-242210 | 9/2007 |
| JP | 2007-242225 A | 9/2007 |
| JP | 2008-067160 A | 3/2008 |
| JP | 2009-104407 A | 5/2009 |
| KR | 20050019291 | 3/2005 |
| WO | WO 2007/132352 A2 | 11/2007 |
| WO | WO 2011/100464 | 8/2011 |

OTHER PUBLICATIONS

"Non Final Office Action dated Sep. 10, 2013", Japan Application 2012-553003, 3 pages.

"Notice of Allowance dated Aug. 23, 2012", U.S. Appl. No. 12/703,919, 5 pages.

Extended Search Report, dated Jul. 16, 2015, 7 pages, for European Patent Application EP11742814, listed as item #7 above.

PCT International Search Report and Written Opinion for PCT International Application No. PCT/US2011/024392.

\* cited by examiner

PROTECTING DEVICES FROM IMPACT DAMAGE

BACKGROUND

In today's world, portable devices have become ubiquitous and often indispensible to our work and personal life. A main convenience is that they are often small and light devices that are easy to hold in a hand, carry in a holster, purse or pocket or otherwise easily transportable. These characteristics of portable devices make them convenient for a user to take wherever they go. Examples of such portable devices include cellular phones, smart phones, personal data assistants, electronic media players, notebook computers, netbook computers, tablet computers, barcode scanners, cameras, video cameras, pagers, portable video game consoles, video game controllers and the like.

People often carry around many types of portable electronic devices. For example, a user may carry a cellular or smart phone, a personal data assistant (PDA) and an audio (e.g. mp3) player. These portable devices are sometimes vitally important to the user as they often contain data that is related to the user's work and personal life. The data may be publically available to all (e.g., mp3, downloaded images) as well as private data that may be difficult or nearly impossible to replace (e.g., photographs, passwords, private telephone numbers).

While the size and weight of portable devices make them convenient to carry around, these characteristics often make them more susceptible to damage and loss. For example, one type of portable device is a cellular phone. At least one report claims 1 out of 3 cellular phones are damaged or lost in the first year of ownership. Damage may occur when a cellular phone experiences an uncontrolled impact with a hard surface or even become submerged in a liquid. With the number of cellular phones in use exceeding several billion and repairs typically exceeding $25, the costs of damage and loss of cellular phones amounts to billions of dollars per year.

DETAILED DESCRIPTION

The technology described herein is a system and method for protecting a portable device from damage due to an impact with a surface. As described herein, various embodiments utilize a damage avoidance system that detects a risk of damage to the portable device caused by an uncontrolled impact with a surface and takes steps to reduce or eliminate that risk. For example, the damage avoidance system may detect that the portable device is no longer in contact with a user and is uncontrollably moving toward a surface such that, upon impact, there is a risk of damage to the portable device. Upon detecting the risk of damage and prior to impact with the surface, the damage avoidance system activates a protection system having one or more protection elements that work in concert to reduce or prevent damage to the portable device upon impact with the surface.

To illustrate a specific example, a cellular phone (a portable device) may be equipped with a damage avoidance system that includes a safety monitoring system and a protection system. If the user drops the cellular phone, the safety monitoring system, through use of various detection elements described below, determines that the device is no longer in contact with the user, measures a distance from an approaching surface (e.g., ground) and determines a velocity toward that surface. Based on the collected information, the safety monitoring system determines whether the risk of damage to the cellular phone, that will be caused by the impending impact, exceeds an acceptable threshold. If the safety monitoring system determines that the risk of damage exceeds the acceptable threshold, the protection system is activated. The protection system, in this example, causes the device to be reoriented and deploys an airbag prior to contact such that the airbag first contacts the surface at impact. Instead of the cellular phone directly impacting the surface, the airbag absorbs the impact and cushions the cellular phone so that damage is reduced or substantially eliminated.

This brief introduction is provided for the reader's convenience and is not intended to limit the scope of the technology described herein. Several example implementations and contexts are provided hereinafter with reference to the following figures, as described below in more detail. However, the following implementations and contexts are but a few of many. For instance, and as discussed above, these techniques apply to a variety of portable devices and for a variety of reorientation elements and protection elements.

Figure 1A:
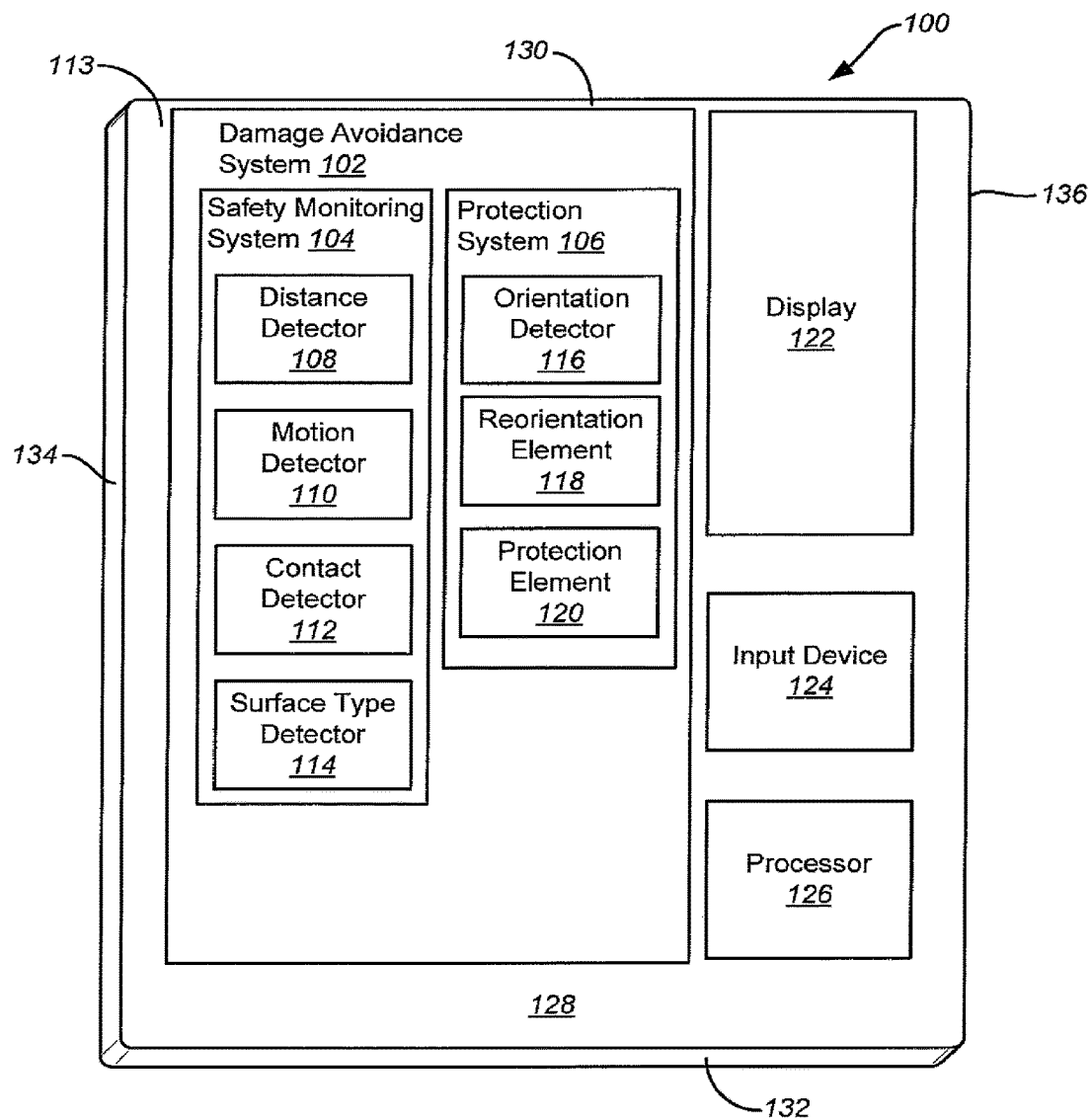
FIG. 1A is a block diagram of an embodiment of a portable device with a damage avoidance system according to the teachings of this disclosure.

FIG. 1A is a block diagram of an embodiment of a portable device 100 according to the teachings of this disclosure. The portable device 100, as discussed above, may be one of any number of devices. In this illustrated embodiment, the portable device 100 includes a damage avoidance system 102 which is capable of detecting whether there is a risk of damage to the portable device that exceeds an acceptable damage threshold and taking steps to reduce or eliminate that damage.

The damage avoidance system 102 includes a safety monitoring system 104 and a protection system 106. The safety monitoring system 104 includes one or more monitoring elements that determine/measure various states and/or information related to the portable device 100. For example, the safety monitoring system 104 may include monitoring elements such as a distance detector 108, a motion detector 110, a contact detector 112 and a surface type detector 114. As will be appreciated, more or fewer monitoring elements may be included in the safety monitoring system 104.

The distance detector 108 may be any number of components that can measure/determine the distance between the portable device 100 or damage avoidance system 102 and a surface (not shown). For example, the distance detector 108 can use a sound or light generator/source (e.g., radar, sonar, laser, and infra-red) in conjunction with a receptor/receiver to capture the reflection of the generated sound or light wave to determine/calculate the distance between portable device 100 and the surface. In some embodiments, the distance detector 108 periodically measures/determines a distance between the portable device 100 and the surface. In other embodiments, the distance detector 108 continuously measures a distance between the portable device 100 and the surface. The distance detector 108 may be disabled until a triggering event occurs (e.g., orientation detector 116 identifies that the portable device 100 is falling) or always be enabled. In yet other embodiments, the distance detector 108 does not measure distance until the contact detector 112 measures/determines that the portable device 100 is no longer contacting another object.

The motion detector 110 measures/determines movement of the portable device 100. For example, the motion detector 110 may measure acceleration or motion of the portable device 100. The motion detector 110 may include, for example, an accelerometer or any type of motion detection device. In some embodiments, the motion detector 110 may receive inputs from components such as an accelerometer and/or the distance detector 108 in order to calculate a velocity of portable device 100. Alternatively, motion detector 110 can use existing circuit(s) of the portable device 100 or a dedicated element in communication with the motion detector 110 to determine the velocity of the device by identifying the difference in power, intensity or other measurement between radio signals received from cellular phone towers or wireless access points. Motion detector 110 may also include a sound or light generator/source in conjunction with a detector/receiver to capture the reflection of the generated sound or light wave to calculate the velocity of portable device 100.

The contact detector 112 measures whether the portable device 100 is contacting or substantially proximate to another object (e.g., a user's hand, desk surface, pocket). For example, the portable device 100 may include a force sensing resistive material on the surface of the device housing 113 that detects whether the portable device 100 is in contact with another object. If the contact detector 112 determines that the portable device 100 is in contact with another object (such as a user), it is unlikely that there is a potential risk of damage to the device as it is likely not out of the user's control. Other embodiments of the contact detector 112 include transmitting and receiving a signal to determine whether the portable device 100 is contacting or substantially proximate to another object or specific type of object including use of transducers, temperature detecting circuitry, infra-red, radar and sonar elements.

The surface type detector 114 may determine the type of surface that the portable device 100 is approaching when moving toward a surface. For example, the surface type detector 114 may measure whether the surface is a solid surface (e.g., concrete, wood floor) or a softer surface (e.g., chair, pillow, hand). The surface type detector 114 may also determine a relative value of ability of the surface to absorb or reflect the energy from the impact of the portable device 100 and the surface. The relative value may be measured or identified as a hardness or firmness of the surface. The surface type detector 114 may use a number of technologies, such as infra-red, radar, x-ray or image recognition to perform the determination of the surface type. For example, using image recognition, the portable device 100 may include a camera and image recognition software. The camera can capture images of the surface, and, using image recognition techniques, the type of surface may be determined. As discussed below, the damage avoidance system 102 may use the surface type in determining whether the risk of damage exceeds an acceptable damage threshold (in consideration with data from the other components of the safety monitoring system 104).

Based on the various data/information provided from the safety monitoring system 104, the damage avoidance system 102 determines if the risk of damage to the portable device 100 exceeds a damage threshold. The damage threshold may vary according to particular needs and/or devices. In some embodiments, the damage threshold may be exceeded if the distance measured between the portable device 100 and the surface is more than the distance at which the portable device 100 underwent drop tests during design or more than the specified operating conditions for the device. In other embodiments, the damage threshold may be exceeded if the safety monitoring system 104 measures that the device is not in contact with another object and exceeds a predetermined velocity. Any combination of measurements, portable device specifications and/or durability test information may be used by the damage avoidance system 102 to determine whether the damage threshold has been, will be or is predicted to be exceeded.

As an example, if the contact detector 112 measures that the portable device 100 is no longer in contact with a user, an accelerometer (not shown) measures that the device is accelerating at a rate of 9.80665 meters/second$^2$ and the distance detector 108 measures that the device is 15 meters from a surface, the damage avoidance system 102 may determine that the risk of damage to the portable device 100 upon impact will likely exceed a damage threshold. If the expected risk of damage exceeds the damage threshold, the damage avoidance system 102 activates the protection system 106, described below, which takes steps to reduce or substantially eliminate the damage to the device that would otherwise be caused at impact with the surface.

In addition to determining whether a risk of damage exceeds a damage threshold, the damage avoidance system 102 may utilize measurements from the safety monitoring system 104 (e.g., distance, velocity, acceleration) to calculate and/or predict a time remaining until impact with the surface. The time remaining until impact may be used by the protection system 106 to determine whether and/or when the reorientation element 118 and/or the protection element 120 should be activated such that the protection element 120 will first impact the surface. For example, if the measured orientation, motion and time until impact are such that the device will impact on a side containing the protection element 120, the protection system 106 may not activate the reorientation element 118. However, if the data measurements indicate that the portable device 100 will impact the surface with a side that does not include a protection element 120, the protection system 106 may activate the reorientation element 118 at a specific time, based on the measurements, so that the portable device 100 is reoriented in a manner that a side with a protection element 120 will first impact the surface. In addition, if the protection element 120 is deployable (e.g., air bag, springs, thrusters), the protection system 106 may use the time remaining until impact to determine when to deploy the protection element 120.

The protection system 106 may include any number of components that work to reduce or eliminate the detected risk of damage to the portable device 100. For example, the protection system 106 may include an orientation detector 116, a reorientation element 118 and a protection element 120. The orientation detector 116 may be a standalone component or combination of components that are designed to detect the orientation of the portable device 100. For example, devices such as accelerometers or tilt sensors could be used. As another example, orientation detector 116 may be a camera associated with the portable device 100. For example, the camera can be located on the back surface of the portable device 100. Images taken from the camera can be indicative of a ceiling, thus, the orientation of the portable device 100 may be that the front surface of the portable device 100 is facing toward the ground. The orientation of the portable device 100 with respect to other surfaces, for example a wall or a table, may then be extrapolated (determined) from such information. Detecting the orientation of the portable device 100 may provide the protection system 106 with information regarding the orientation of portable device 100 with respect to approaching surface(s). As described below, this information may help the protection system 106 determine what actions to take so that the portable device 100 will be in a desired orientation at impact with the surface.

The reorientation element 118 may be any number of elements that can alter the orientation of the portable device 100. In general, the reorientation element 118 may produce a force, alter a physical property or otherwise create a change in and/or alter the orientation of the portable device 100 with respect to a surface. As discussed below with respect to FIGS. 7-10, examples of the reorientation element 118 may be a gas expelled from a compressed gas cartridge, a rotational modifier, a moveable weight or other types of devices that can cause reorientation of the portable device 100. An example reorientation technique using a moveable weight may be to relocate the position of the battery within portable device 100 to alter or create a rotation of portable device 100. Yet another technique may be to utilize actuators to cause vibrations in the portable device 100 that cause portable device 100 to rotate in a desired direction. These techniques may be used alone or in conjunction with each other. Other techniques may be readily apparent to a person skilled in the relevant art. In one embodiment, reorientation element 118 and protection element 120 can be combined into a single element. For example, the same propulsion elements can be used to alter the device orientation (See FIG. 7) as well as cause a gentle or safe landing (See FIG. 3).

The protection element 120 may be any number of elements that help protect the portable device 100 from damage due to impact with a surface. In general, the protection element 120 acts to absorb the energy that would otherwise transfer to portable device 100 or to components inside the portable device 100 as a result of impact with a surface.

For example, the protection element 120 may be an energy-absorbing material, a material that allows the kinetic energy of portable device 100 to be dissipated over a greater time or area, a material that reduces the kinetic energy of portable device 100 or other appropriate materials. As discussed with respect to FIGS. 2-6, examples of the protection element 120 may be one or more of an airbag, a propulsion element, a spring, an impact absorbing structure and a reinforced edge, among others.

In addition to the elements described above, the portable device 100 may also contain a display 122, an input device 124 (e.g., keypad) and a processor 126. The processor 126 may be any number of devices that are commonly thought of as central processing units (CPUs) or any device that is capable of receiving an input, performing an operation on the input and producing an output. In general, the processor 126 may be the CPU of the portable device 100 or may be additional processing units that are used alone or in conjunction with the CPU in order to provide functionality to the portable device 100 and/or the damage avoidance system 102.

It should be understood that display 122 and input device 124 are not required, but rather are used herein to help provide a frame of reference when discussing the orientation of portable device 100. As used herein, the front surface 128 of the portable device 100 is the side that contains the display 122 and the input device 124. The back surface (not shown) of the portable device 100 is the side opposite the front surface 128. The top surface 130 is a side of the portable device 100 that perpendicularly extends between the front surface 128 and the back surface that is closer to the display 122 and further away from the input device 124. The bottom surface 132 is the side opposite the top surface 130. The left surface 134 is the side perpendicularly extending between the top surface 130 and the bottom surface 132 that is to the left of the display 122 as it faces a user. The right surface 136 is the side opposite the left surface 134.

Figure 1B:
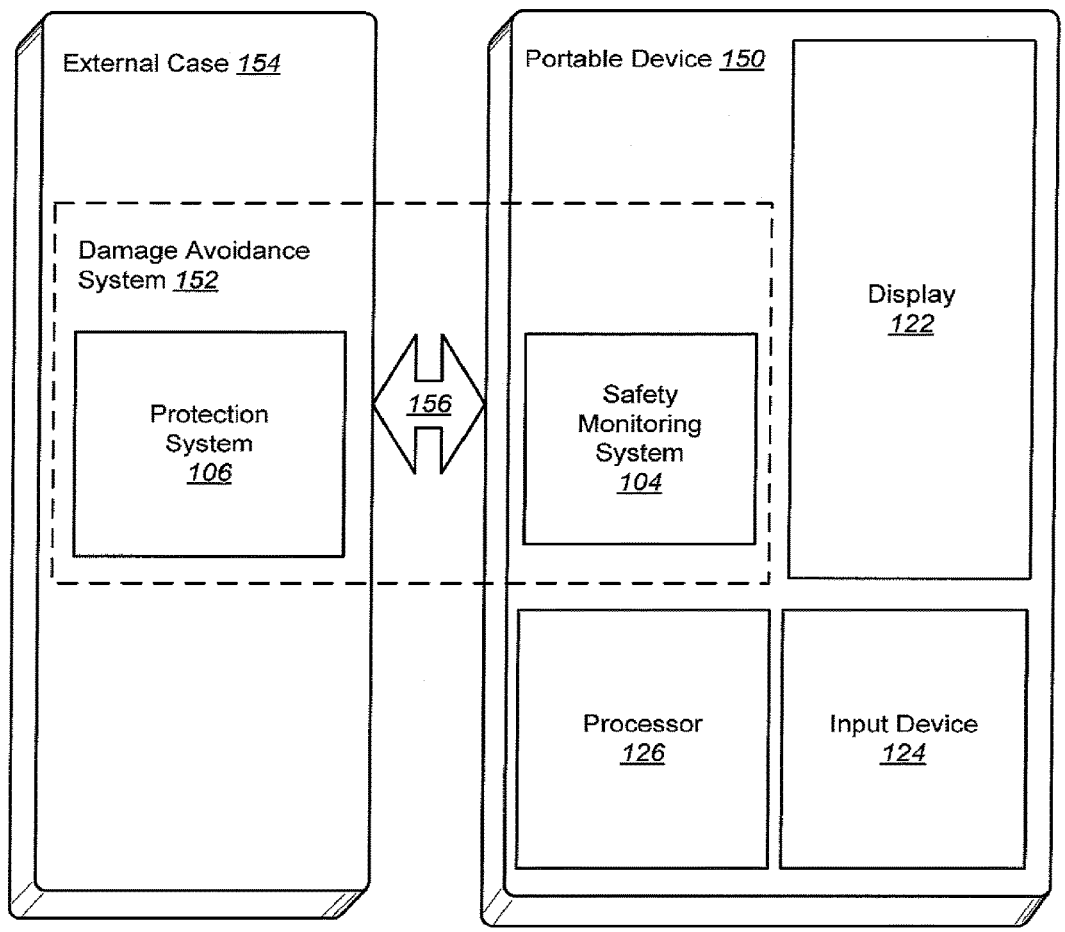
FIG. 1B is a block diagram of an embodiment of a removably attachable damage avoidance system and a portable device.
Figure 1C:
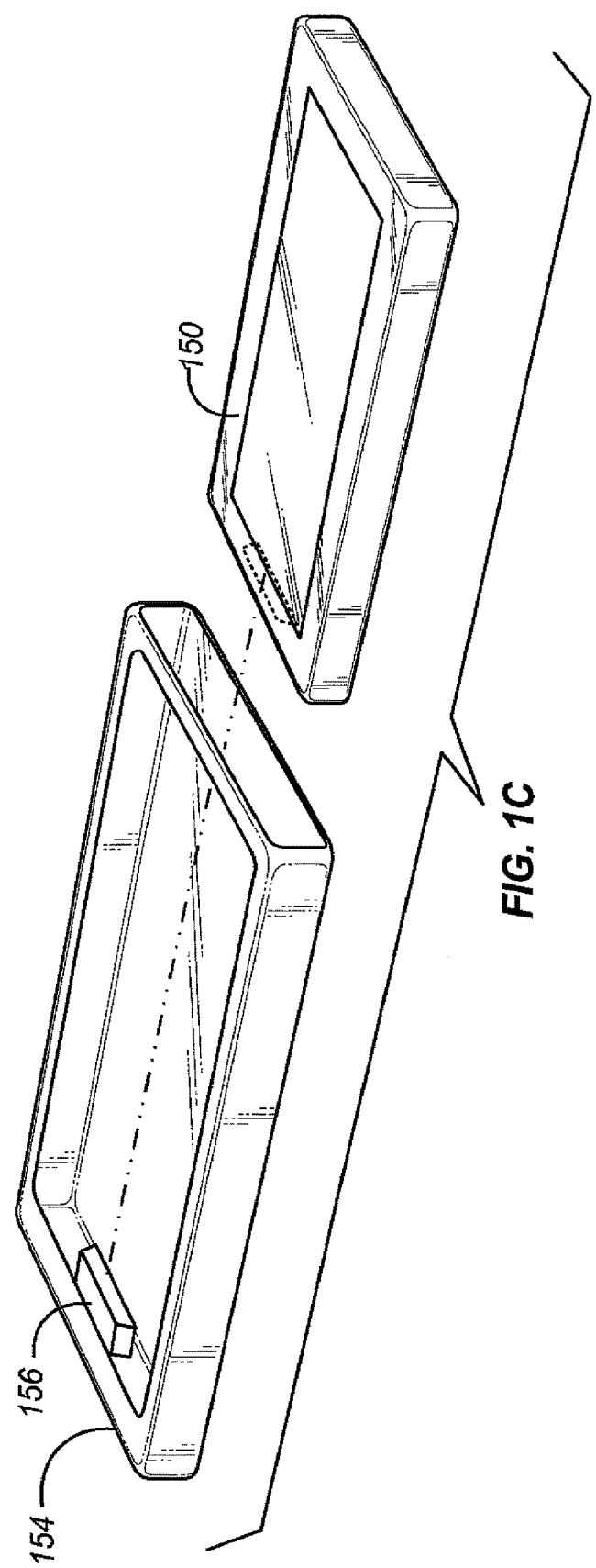
FIG. 1C is a perspective view of an embodiment of a portable device having the removably attachable damage avoidance system of FIG. 1B.

Although FIG. 1A illustrates that the damage avoidance system 102 is integral to the portable device 100, in other embodiments one or more components of the damage avoidance system 102 may be removably attached to the portable device 100. FIG. 1B illustrates a portable device 150 using a removably attachable damage avoidance system 152. For example, one or more components of the damage avoidance system 152 may be housed in an external case 154 that is removably attachable to the portable device 150. In this example, the safety monitoring system 104 is included in the portable device 150 and may utilize existing components of the portable device 150 (e.g., accelerometer, camera, contact detector 112, processor 126, etc.). The protection system 106 is included in the external case 154 and communicates with the safety monitoring system 104 using any type of wired or wireless data communication path 156. For example, the external case 154 may connect with and communicate through a universal serial bus on the portable device 150. As illustrated in the block diagram of FIG. 1B and the perspective view of FIG. 1C, the damage avoidance system 152 may be contained in both the portable device 150 and the external case 154 and optionally use existing components of the portable device 150. In some embodiments, the damage avoidance system 152 may be completely contained in the external case 154. In still another embodiment, not shown, a majority of the damage avoidance system 152 may be contained in the portable device 150 and a single use element (e.g., air bag) of the protection system 106 may be contained in the external case 154. In such an example, other portions of the protection system 106, contained in the portable device 150 may communicate with the single use element via the communication path 156 causing the single use element to activate or deploy prior to impact. After use, the external case 154 can be removed and replaced for future use. Regardless of configuration, the damage avoidance system 152 effectively operates in the same manner to determine whether a risk of damage to the portable device 150 exceeds a damage threshold and takes steps to reduce or eliminate that risk.

FIGS. 2-6 illustrate various embodiments of the protection element 120 (FIG. 1A). FIG. 2A illustrates an embodiment of portable device 200 having an airbag 202. A deflated airbag 202 may be embedded into the portable device 200. The airbag 202 may be coupled to a compressed gas cartridge 204. Upon detection by the damage avoidance system 102 that the risk of damage exceeds a damage threshold, the protection system 106 may cause the airbag 202 to deploy out of a side and/or from a face of portable device 200 prior to impact. The airbag 202 may be inflated by the compressed gas cartridge 204. For example, the gas cartridge may be a compressed air or carbon dioxide cartridge. In certain embodiments, the airbag 202 may be deployable from multiple sides and/or face(s) of portable device 200. Thus, airbag 202 can be deployed from the side of portable device 200 that is expected to impact the surface. Alternatively, there may be multiple airbags 202 that are deployable to cover all or some of the sides of portable device 200. In general, airbag 202 should deploy at least on a side that will first impact the surface.

Figure 2A:
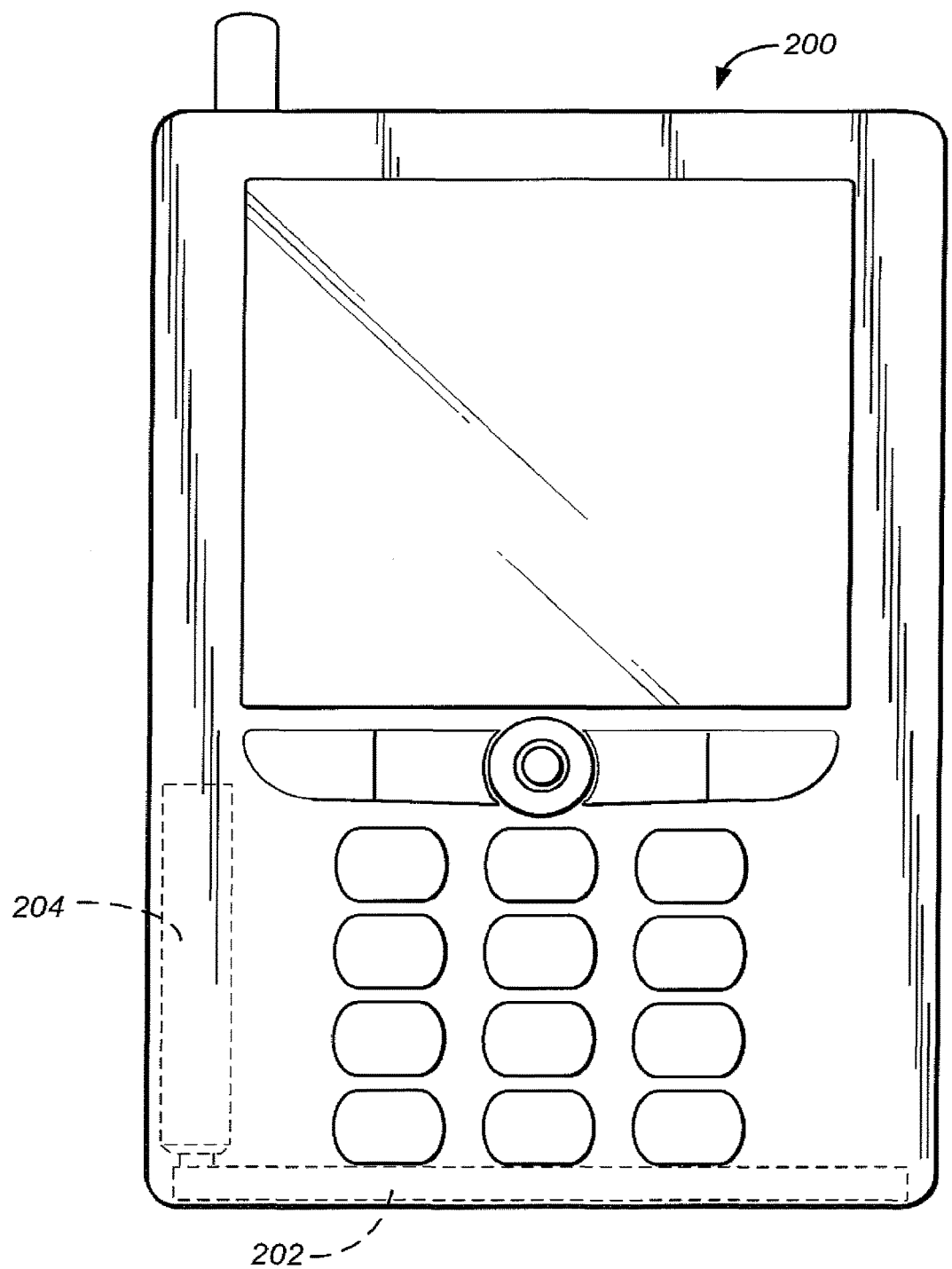
FIG. 2A illustrates an embodiment of a portable device having a protection element that includes an airbag.
Figure 2B:
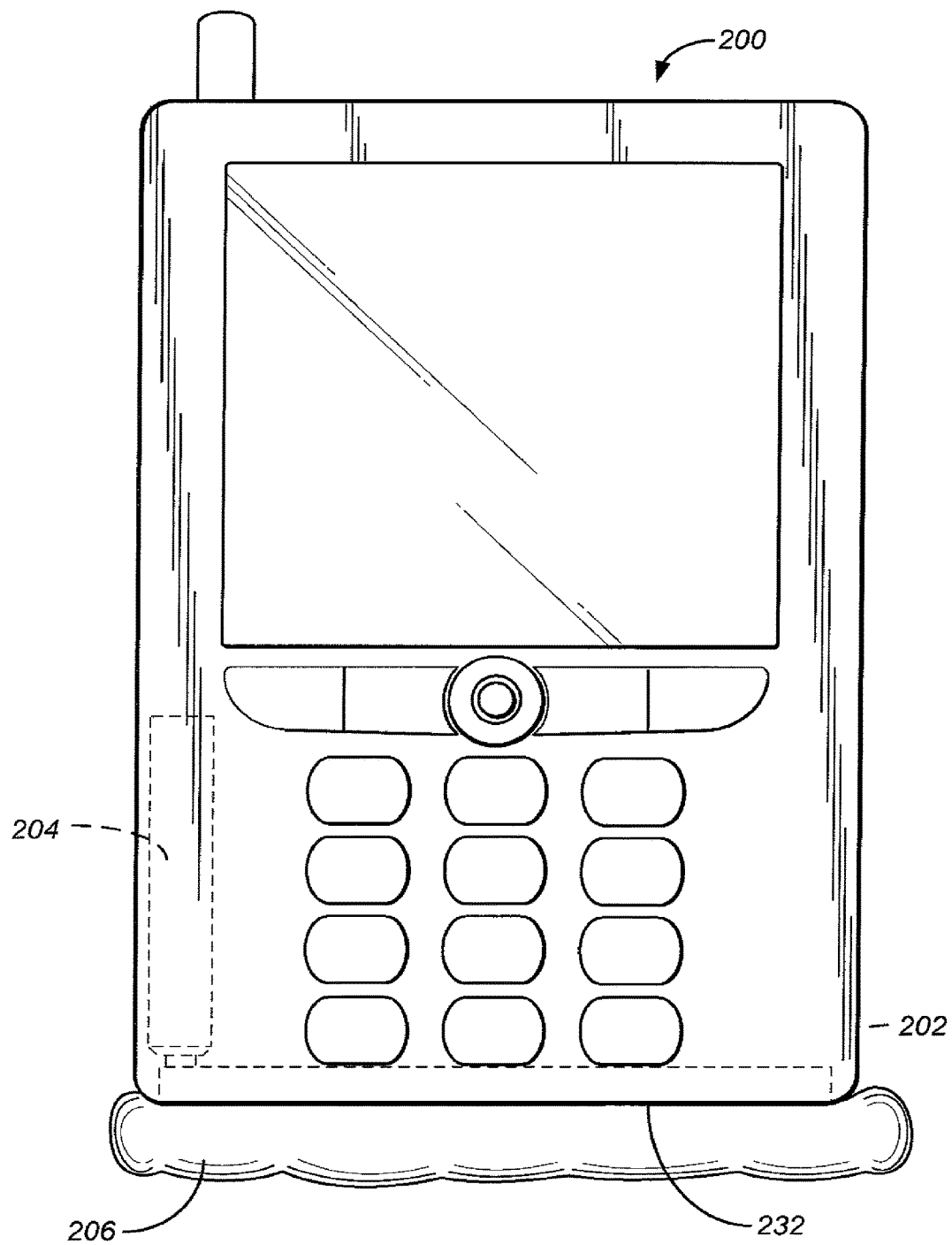
FIG. 2B illustrates an embodiment of the portable device of FIG. 2A where the airbag has been deployed.

FIG. 2B illustrates an embodiment of portable device 200 in which airbag 202 has been deployed as inflated airbag 206. FIG. 2B shows inflated airbag 206 along the bottom surface 232 of portable device 200. Inflated airbag 206 provides a cushion along the bottom surface 232 of portable device 200 such that upon impact, inflated airbag 206 reduces (or eliminates) the energy transferred to portable device 200 due to impact with the surface. The airbag may, in some embodiments, be deployed from another surface of the portable device 200 (as well as more than one surface). In addition, multiple airbags 202 may be deployed from the side(s)/face(s).

Figure 3:
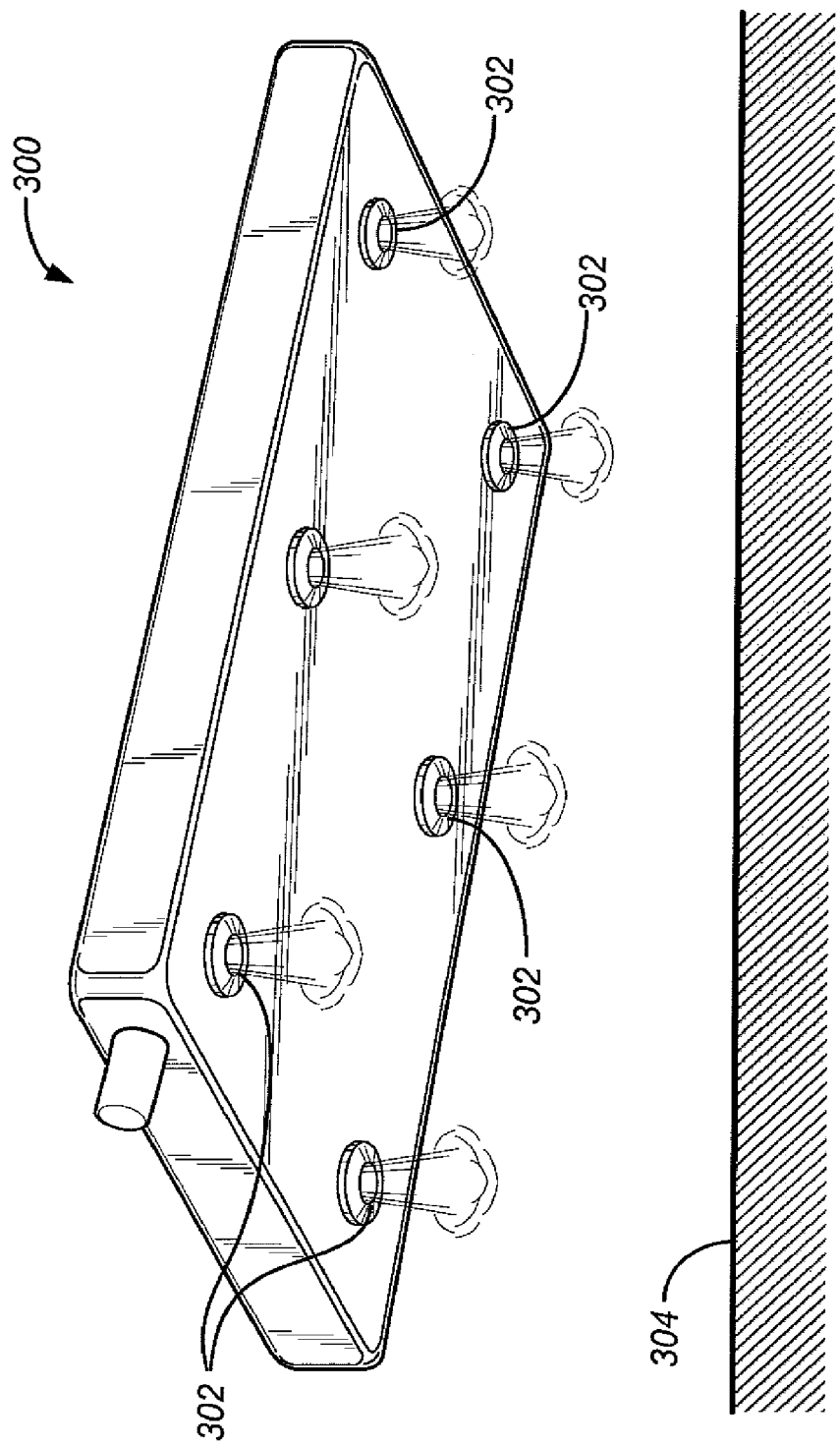
FIG. 3 illustrates an embodiment of a portable device having a protection element that includes a propulsion element.

FIG. 3 illustrates an embodiment of portable device 300 having a protection element 120 that includes one or more propulsion elements 302. Propulsion elements 302 may operate to propel and/or expel a gas from the portable device 300 to reduce the speed of portable device 300 as it travels toward an impact surface 304 substantially in the orientation shown in FIG. 3. A compressed gas cartridge, as described above, may be used as a source for the gas.

Figure 4:
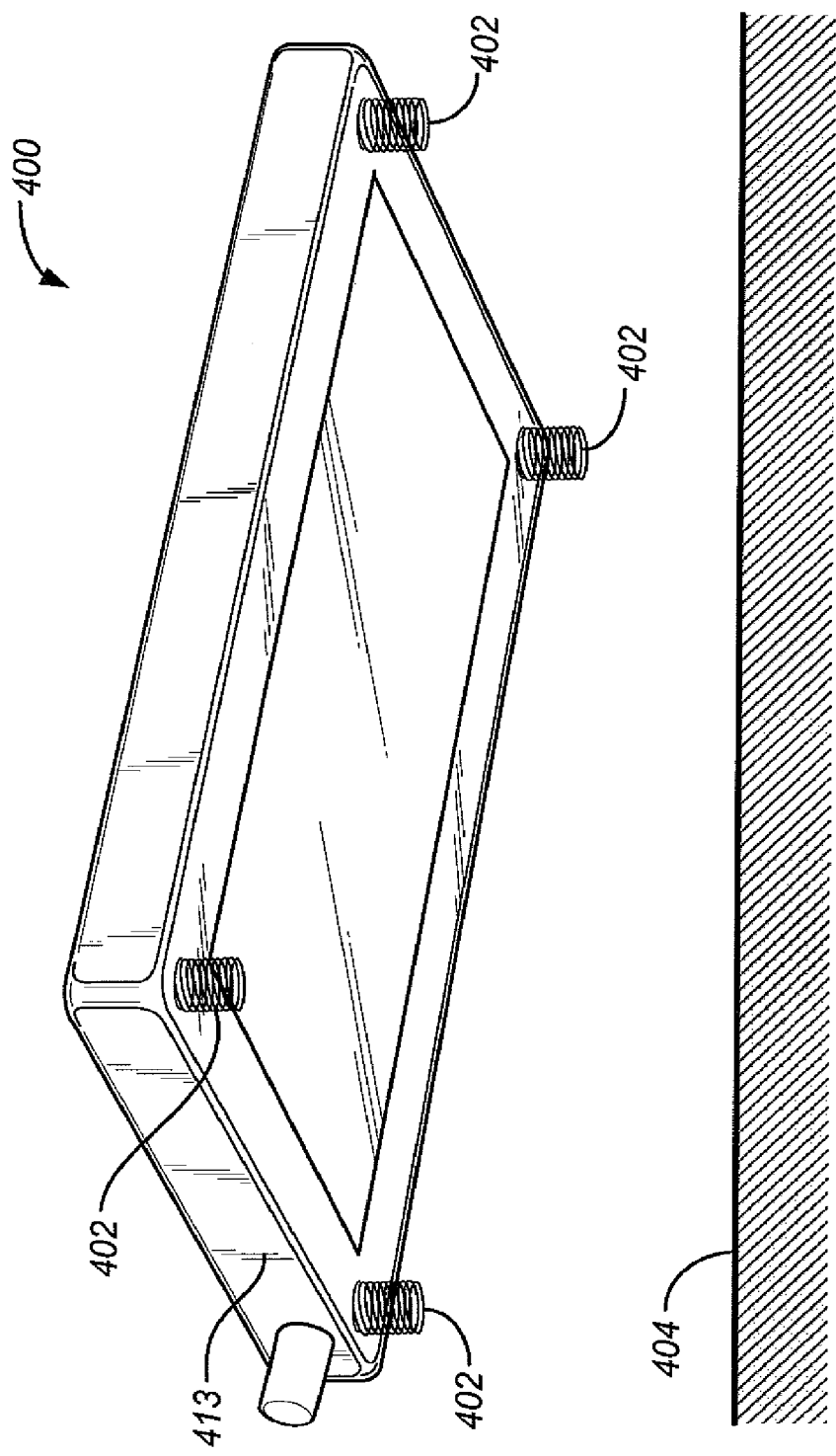
FIG. 4 illustrates an embodiment of a portable device having a protection element that includes one or more springs.

FIG. 4 illustrates an embodiment of portable device 400 having an embodiment of protection element 120 that includes one or more springs 402. In one instance, one or more springs 402 are deployable from one or more side(s) or face(s) of portable device 400 prior to impact in order to absorb at least a portion of the impact energy to minimize or prevent damage to portable device 400. In such an embodiment, portable device 400 may be reoriented prior to impact such that deployed springs 402 are substantially perpendicular relative to the impact surface 404. In some embodiments, one or more springs 402 may be located within the body of portable device 400 such that a portion of housing 413 is physically separated from at least some of the internal components within portable device 400 prior to impact. This way, upon impact, the housing 413 first impacts the surface 404. As a result, the housing 413, in combination with the spring(s) 402, prevent the impact energy from transferring to the internal components.

Figure 5A:
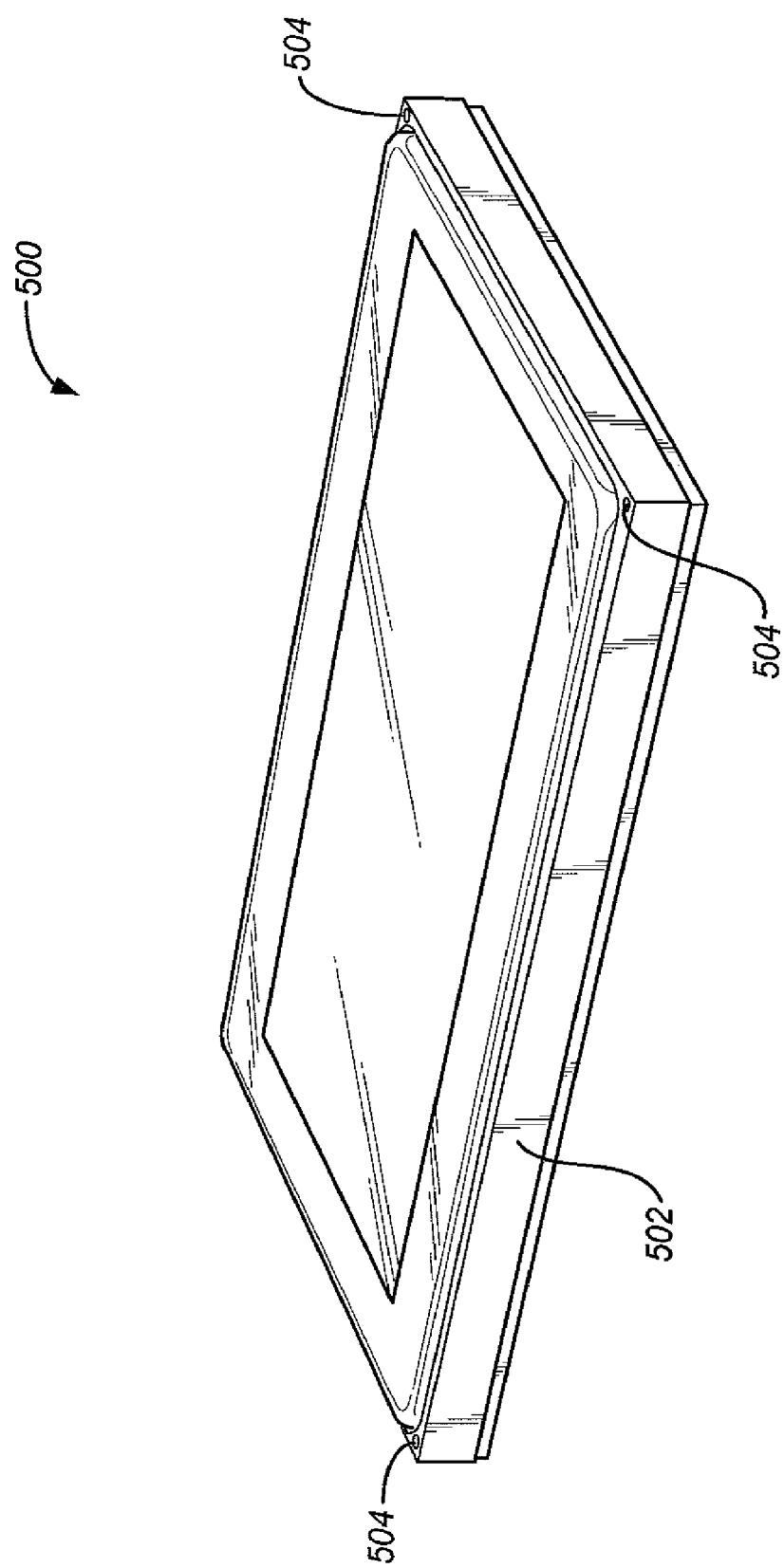
FIG. 5A illustrates an embodiment of a portable device having a protection element that includes an impact absorbing structure.
Figure 5B:
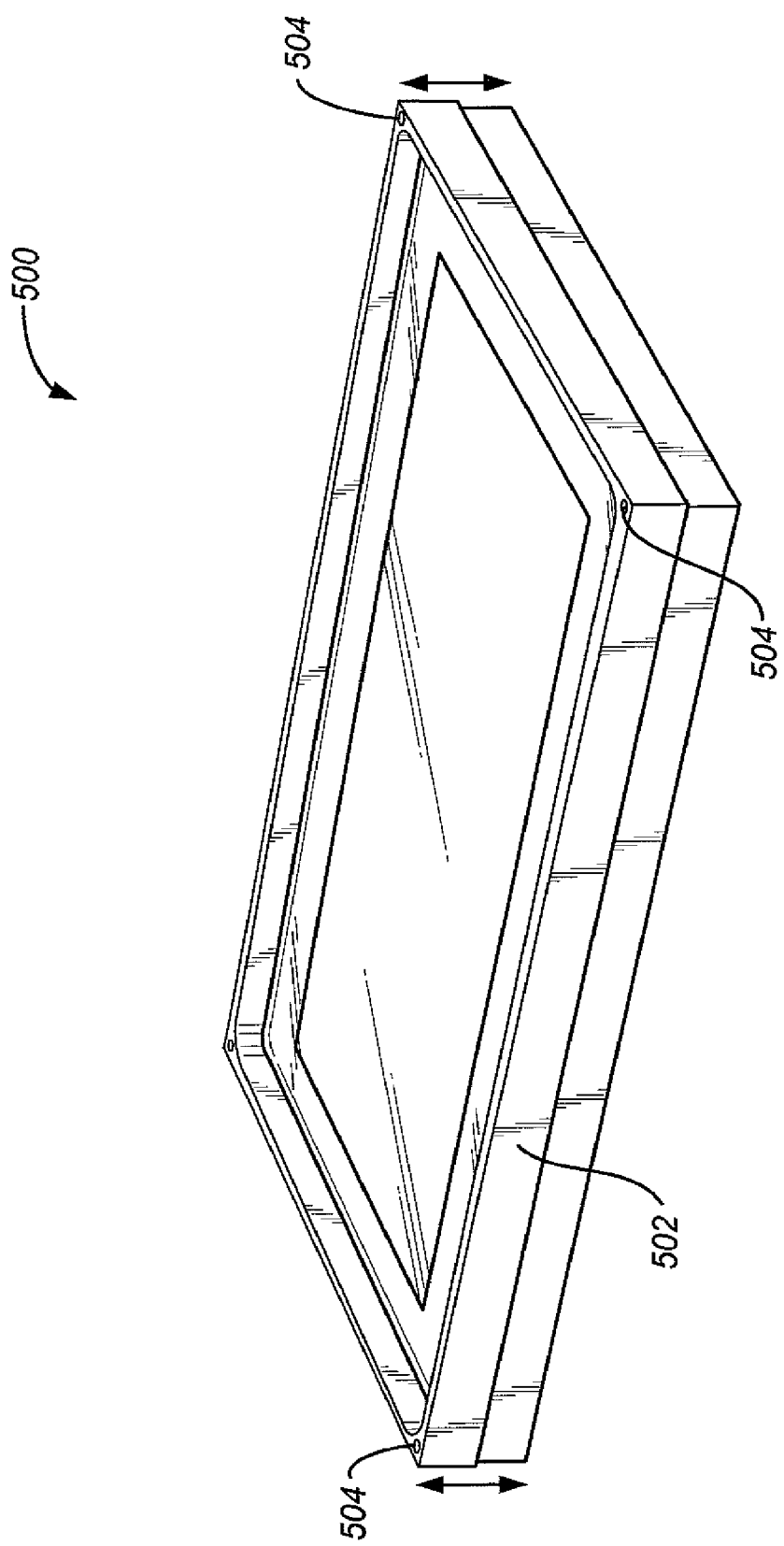
FIG. 5B illustrates an embodiment of the portable device of FIG. 5A having a protection element that includes an impact absorbing structure that has been deployed.

FIGS. 5A-5B illustrate an embodiment of portable device 500 having an embodiment of protection element 120 that includes a protection structure 502 in a non-deployed position (FIG. 5A) and in a deployed position (FIG. 5B). The protection structure 502 can comprise a portion of the portable device 500 such as a bezel, housing panel or other portion of the portable device 500. Springs 504 are operable to push the protection structure outward from the device when the safety monitoring system 104 determines that a risk of damage exceeds a damage threshold. In this way, protection structure 502 may be deployed from the portable device 500 prior to impact with the surface. In some embodiments, protection structure 502 is a rigid structure once deployed. In other embodiments, protection structure 502 is designed to collapse and absorb energy associated from the impact with the surface. The protection structure 502 may be retracted into portable device 500 during normal use of portable device 500 and may be compressed back into the retracted position, as shown in FIG. 5A, after deployment for multiple uses. In some embodiments, the protection structure 502 can be made of material that is designed to break or deform upon contact with the impact surface, thus providing additional cushioning to portable device 500.

Figure 6:
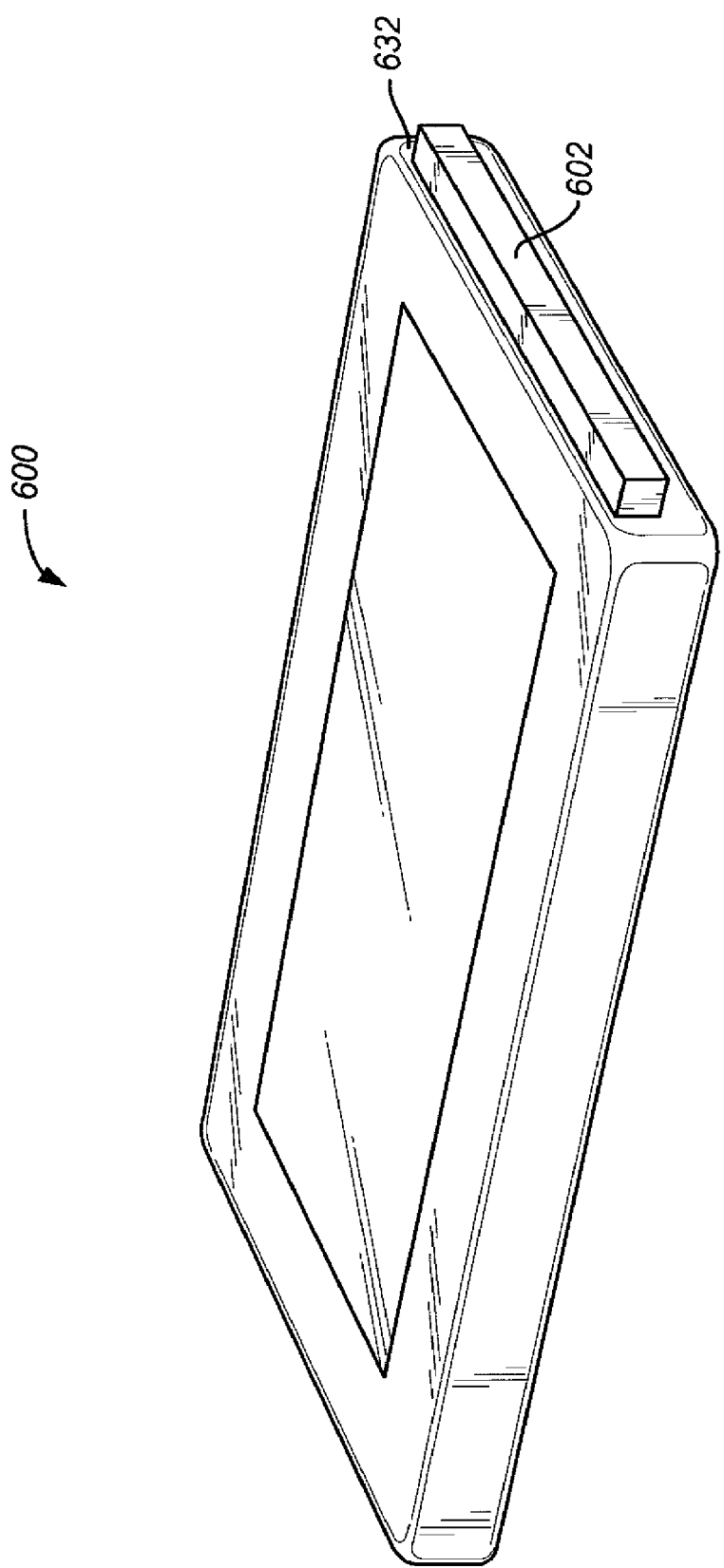
FIG. 6 illustrates an embodiment of a portable device having a protection element that includes a reinforced edge.

FIG. 6 illustrates an embodiment of portable device 600 having an embodiment of protection element 120 that includes one or more reinforced edges 602. Although reinforced edge 602 is shown in FIG. 6 to extend substantially the entire length of the bottom surface 632 of portable device 600, in some embodiments, reinforced edge 602 may partially extend along one or more edge(s) or face(s) of portable device 600. Reinforced edge 602 may include material such as, but not limited to, rubber, foam, neoprene or any other energy-absorbing or compressible material. Reinforced edge 602 may be a retractable element that is located within portable device 600 while operating in "normal" use and deployed when the safety monitoring system 104 determines that a risk of damage exceeds the damage threshold. In some embodiments, reinforced edge 602 can be retracted back into portable device 600 after being deployed.

Although the addition of a protection element 120 to the portable device 100 is described, it should be understood that the addition of a protection element 120 is optional. For example, even though a portable device 100 may not have a protection element 120, protection system 106 may be configured to reorient the portable device 100 such that a face of the portable device 100 with a large surface area (relative to other faces of the portable device 100) first impacts the surface. Striking this surface spreads the force of impact across a greater area, thus minimizing damage to a portable device 100. Additionally, although certain embodiments of protection element 120 have been described above, these embodiments are for illustrative purposes only, and it is not the intent to limit the scope of this disclosure to such embodiments. Other embodiments that are readily apparent to those skilled in the relevant art are within the spirit and scope of this disclosure.

Figure 7:
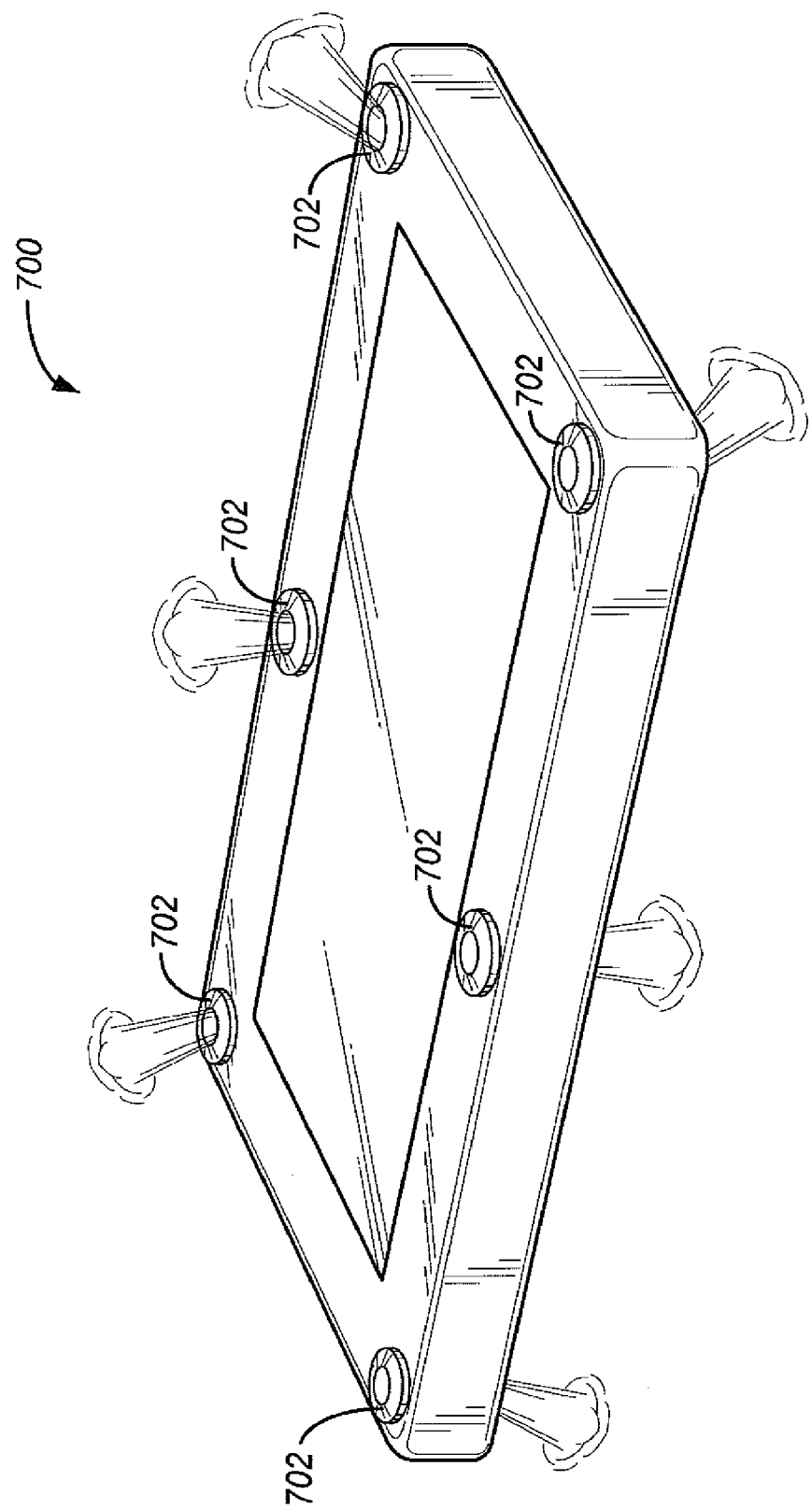
FIG. 7 illustrates an embodiment of a portable device having a reorientation element that includes a propulsion element.

FIG. 7 illustrates an embodiment of a portable device 700 where the reorientation element 118 includes one or more openings 702 in the portable device 700. The portable device 700 may have more or fewer openings 702 than shown in FIG. 7. The openings 702 may extend completely through the portable device 700 or extend only partway through the portable device 700. The openings 702 may also be modifiable (e.g., a valve), fixed or any combination of modifiable and fixed openings.

In some embodiments, the openings 702 may be used to reorient the portable device 700 while it is traveling in the air. The openings 702 may also provide the portable device 700 with the ability to alter its angular momentum to either increase or decrease its rate of rotation. As will be discussed in more detail below, altering the rate of rotation of portable device 700 may allow protection element 120 (FIG. 1A) to be in a position to protect portable device 700 from damage caused by impact.

As an example of using openings 702 as a reorientation element 118, openings 702 in portable device 700 may comprise a propulsion element to allow gas to be forced through the openings 702 in order to impart an additional force to alter the orientation of the portable device 700. In this embodiment, the openings 702 travel partway through portable device 700 so that the gas can be expelled from a side or selectable portion of portable device 700. For example, the portable device 700 may include one or more compressed gas cartridges (not shown) and valves (not shown) that may be used to control from which openings 702 the gas is expelled and the rate of expulsion from each cartridge. By selectively expelling gas through certain openings 702 and controlling the rate of gas expelled from each opening, the angular momentum of the portable device 700 can be altered. The gas can be used to increase or decrease the rate of rotation of the portable device 700 so that at the point of impact with the surface, the portable device 700 is oriented so that a side with a protection element 120 first impacts the surface. As depicted in FIG. 7, gas can be forced through one opening 702 on one side (e.g. top) of the portable device 700, and gas can be forced through another opening 702 on the opposite side (bottom) of the portable device 700. This allows extra force to increase or decrease the rate of rotation of the portable device 700. In some embodiments, openings 702 may be adjustable in order to expel the gas in one or more directions.

According to one embodiment, as portable device 700 is travelling toward the impact surface, it may be desired to alter the orientation of the portable device 700 by thirty degrees so that the back surface (not shown) of the portable device 700 first impacts the surface. Utilizing the damage avoidance system 102, it is determined that additional angular momentum is required in order to achieve the desired orientation before impact with the surface. Accordingly, the damage avoidance system 102 causes the reorientation element 118 to expel gas through one or more openings 702 to provide additional angular momentum to alter the orientation of portable device 700 so that a thirty degree rotation can be achieved prior to impact.

As another embodiment, the openings 702 in the portable device 700 may not use any propulsion element at all. In one embodiment, the openings 702 may extend through the portable device 700 and are modifiable from either side of the portable device 700. For example, one or more openings 702 can be selectively opened or closed to alter the air resistance on a side of portable device 700. A control element such as a solenoid and/or motor (not shown) in the portable device 700 may cause a cover to partially or completely block one or more of the openings 702 thereby altering the resistance on a side of the portable device 700. By increasing or decreasing the air resistance, the orientation of portable device 700 can be altered.

In addition, reorientation element 118, openings 702 and/or one or more of the propulsion element(s) that operate to alter or modify the orientation of portable device 700 may be used to reduce the force at the time of impact with the surface. For example, in one embodiment, gas is expelled from the openings 702 so that as portable device 700 nears the surface, the velocity of the portable device 700 is reduced.

Figure 8A:
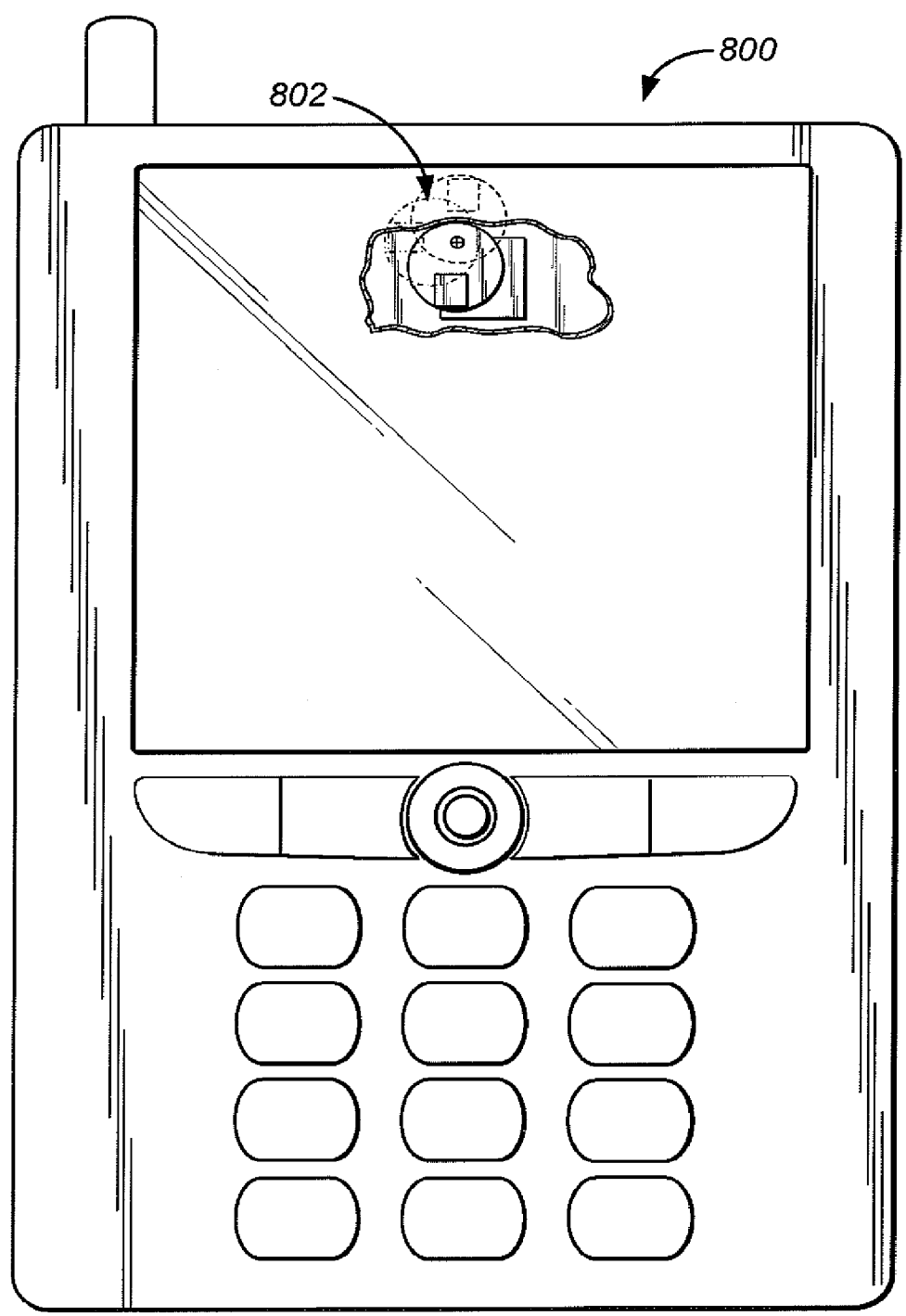
FIG. 8A illustrates an embodiment of a portable device having a reorientation element that includes a rotational modifier.
Figure 8B:
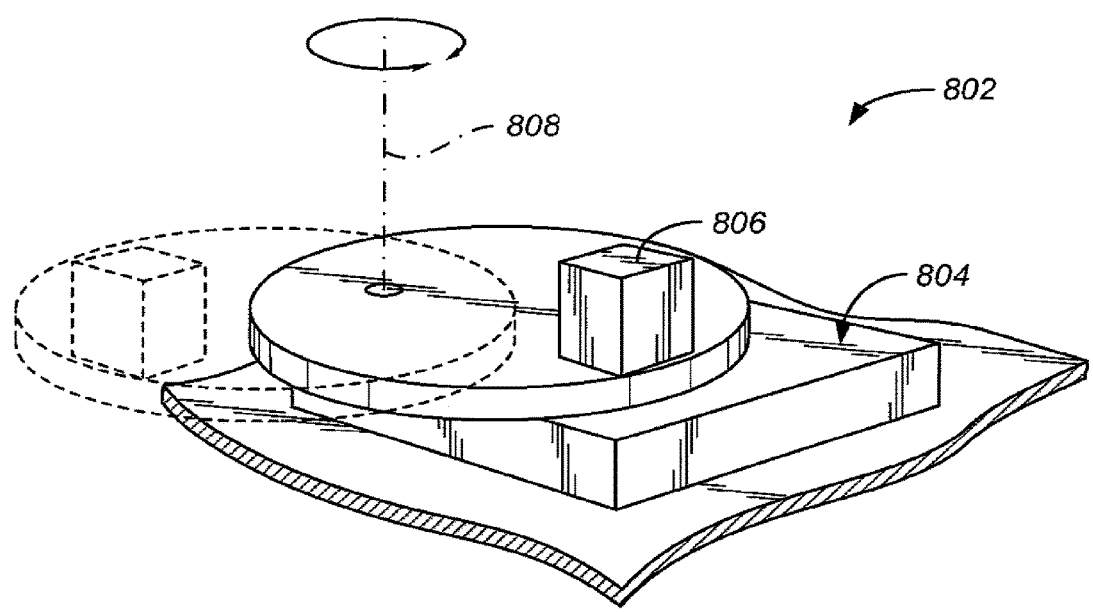
FIG. 8B illustrates an embodiment of a reorientation element that includes the rotational modifier of FIG. 8A in one possible position.
Figure 8C:
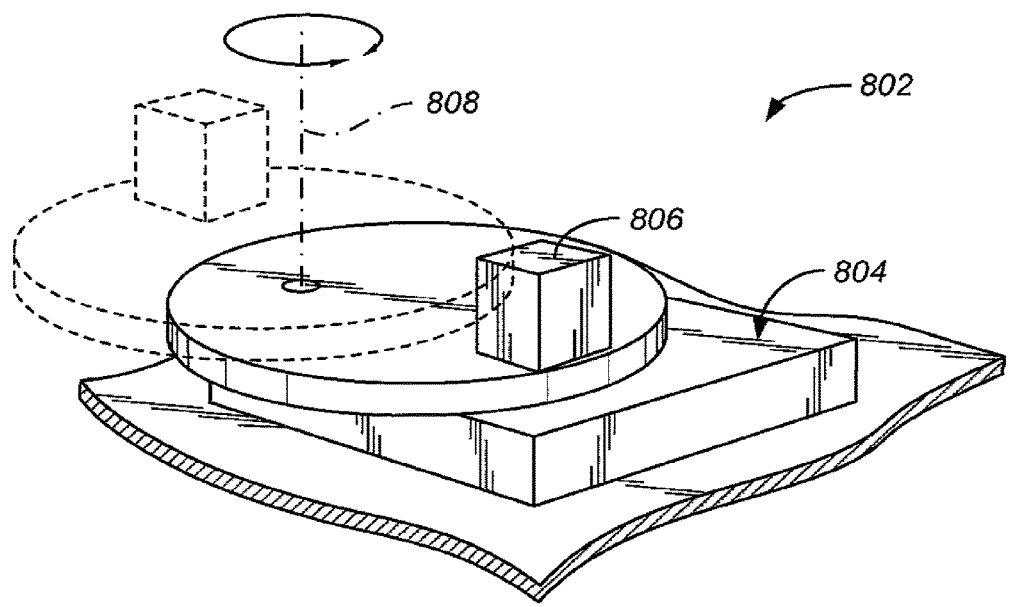
FIG. 8C illustrates an embodiment of a reorientation element that includes the rotational modifier of FIG. 8A in another possible position.

FIGS. 8A, 8B and 8C illustrate an embodiment of a portable device 800 where the reorientation element 118 includes a rotational modifier 802. Rotational modifier 802 may be any number of components that can modify the rotation of the portable device 800. Modifying the rotation of the portable device 800 may allow a desired side of the portable device 800 to first impact the surface.

An illustrative rotational modifier 802 may be an actuator or other type of vibration mechanism, such as a motor 804 attached to an offset weight 906 (as shown in FIGS. 8B and 8C). The vibration mechanism can rotate to a selected position and then vibrate on a side of the portable device 800 to provide impulses in a particular direction to increase or decrease rotation of the portable device 800. In some embodiments, rotational modifier 802 can be a gyroscope. For example, a gyroscope can be designed to increase or decrease the rate of rotation of the portable device 800. In operation, when the damage avoidance system 102 determines that, based on the current rate of rotation of the portable device 800, a side of the portable device 800 without a protection element 120 will first impact the surface, the damage avoidance system 102 may cause the protection system 106 to activate a gyroscope (reorientation element 118) to reorient portable device 800.

While in some embodiments the rotational modifier 802 is operable to rotate the offset weight 806 such that it creates a substantially continuous vibration in the device, in other embodiments the offset weight 806 can be rotated into one or more alternative positions from its normal position in order to alter the center of mass of portable device 800. For example, FIG. 8B illustrates an embodiment of reorientation element 118 that includes the rotational modifier 802 of FIG. 8A in one possible alternative position. As depicted, the motor 804 is operable to rotate offset weight 806 about axis 808. The position of the offset weight 806 depicted in solid lines can denote a position in which the offset weight 806 is in a normal position, while the position depicted in hashed lines depicts the offset weight 806 in a first offset position. Similarly, FIG. 8C illustrates an embodiment of reorientation element 118 that includes the rotational modifier 804 of FIG. 8A in a second possible alternative position. Here, the position depicted in solid lines again denotes the position in which the offset weight 806 is in a normal position, while the position depicted in hashed lines depicts the offset weight 806 in a second offset position. Accordingly, the center of mass of portable device 800 is altered as needed by moving the offset weight 806 into these example alternative positions.

Figure 9A:
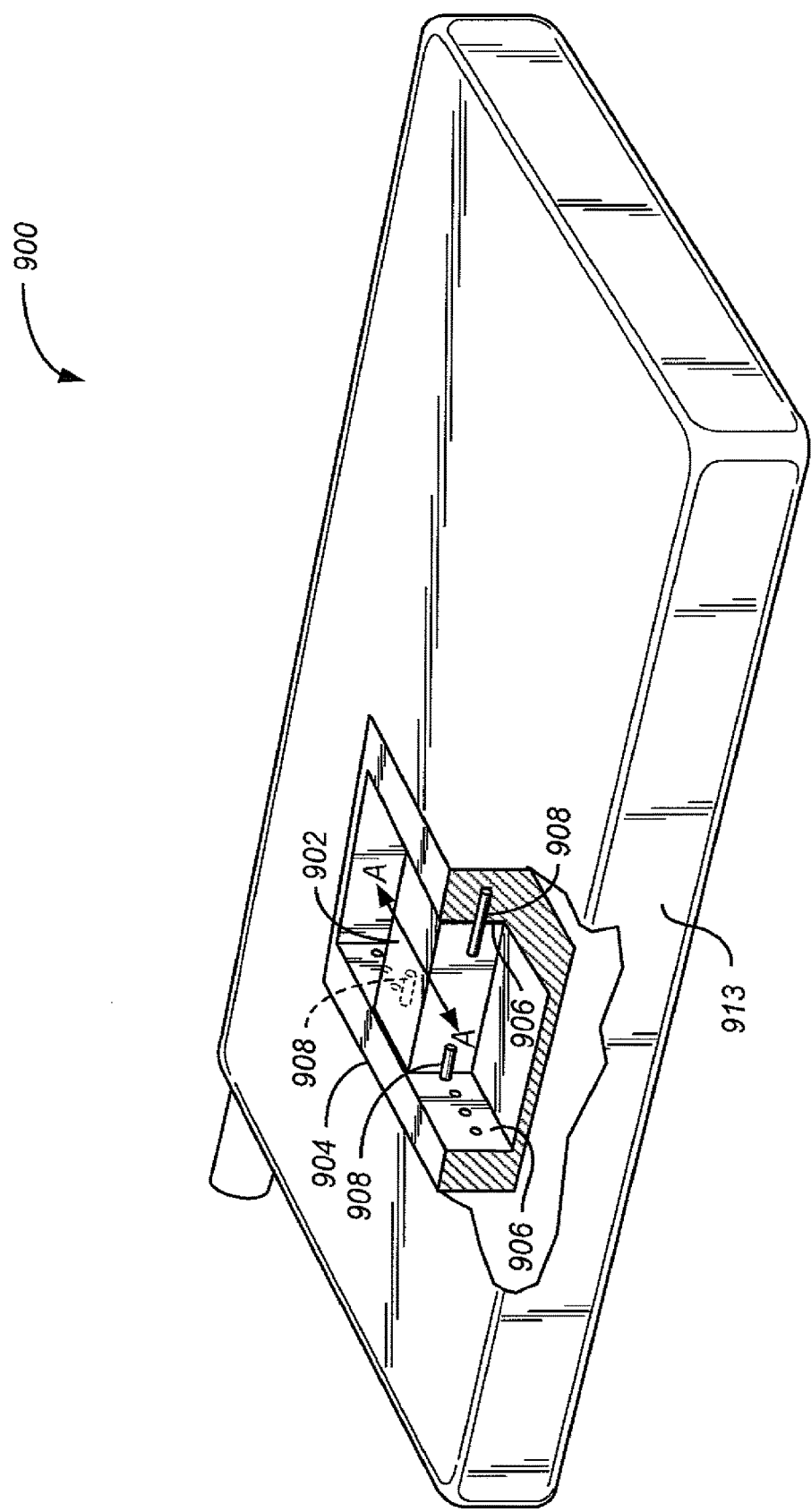
FIG. 9A illustrates an embodiment of a portable device having a reorientation element that includes a weight.
Figure 9B:
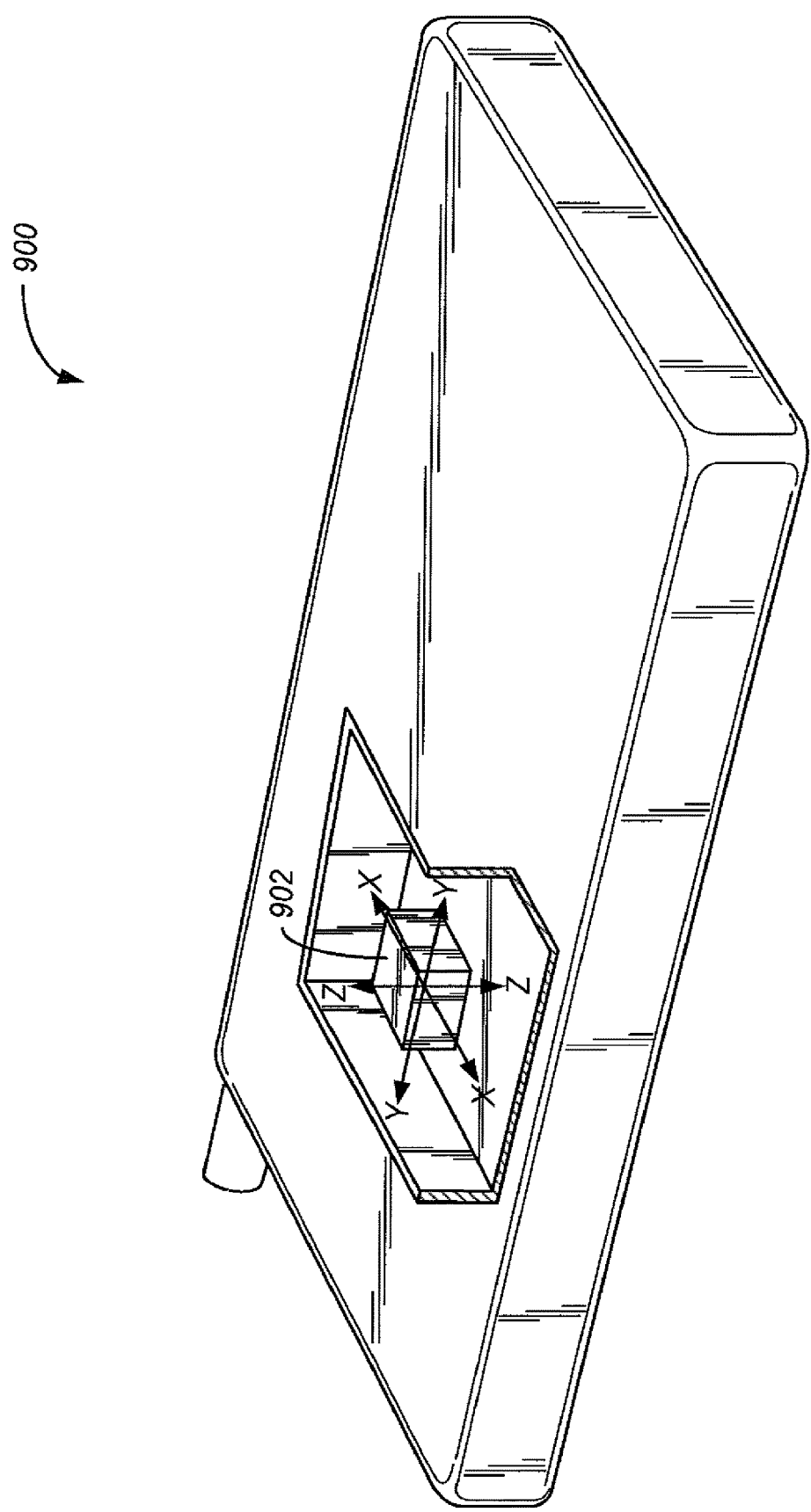
FIG. 9B illustrates another embodiment of a portable device having the reorientation element of FIG. 9A that includes a weight that is movable along the X, Y and Z axes.

FIGS. 9A and 9B illustrate an embodiment of a portable device 900 where the reorientation element 118 includes a movable weight 902. FIG. 10A illustrates a rear view of the portable device 900, whereby a portion of the housing 1013 has been removed to expose a compartment 904. A movable weight 902, when moved, alters the center of gravity of the portable device 900 to cause a change in the rate or direction of rotation of the portable device 900.

In one embodiment, the movable weight 902 is a relatively heavy component of the portable device 900, such as a battery. By altering the location of the movable weight 902 within the compartment 904, the center of gravity of the portable device 900 is altered. Using a battery as movable weight 902 to change the center of gravity of portable device 900, as well as providing power to portable device 900, allows the battery to serve multiple purposes and eliminates the need to have a separate movable weight 902 in the portable device 900.

FIG. 9A illustrates that, according to some embodiments, the movable weight 902 may be placed on rails 906 within compartment 904 in the portable device 900. The movable weight 902 may be held in place by various objects, such as retractable pins 908, which can releasably control an object in place along the rails 906. When it is desired to relocate the movable weight 902 within compartment 904 in order to change the center of gravity of the portable device 900, one set of pins 908 may be withdrawn to allow the movable weight 902 to slide along the rails 906 to a new location within the portable device 900. Alternatively, or in addition to the rails 906, a motor (not shown) can cause the movable weight 902 to move along the rails 906 to a desired location.

Although FIG. 9A illustrates that the movable weight 902 has only one degree of freedom along the rails 906 (as shown by arrow A-A), FIG. 9B illustrates that the movable weight 902 may be able to move in additional degrees of freedom (e.g. along any number of axes, including the X, Y and Z axes) in other embodiments. At some time after recovery of the portable device 900, the movable weight 902 can be returned to its original position and re-secured on the rails 906. In yet other embodiments, the moveable weight 902 is example of an ejectable element that can be completely ejected from the portable device 900. This ejection can serve to change the center of mass of the portable device 900, cause the portable device 900 to have a lower mass at impact and/or alter the orientation of the portable device 900 from the force of the ejection of the moveable weight 902 (e.g. from springs or other mechanisms operable to eject the moveable weight 902 from the portable device 900). The ejectable element can include one or more relatively heavy components of the portable device 900. Similarly, an ejectable element may be ejected but remain within portable device 900. The ejectable element may be ejected to reduce the possible damage to sensitive components or to reduce a stress or strain on another element (e.g., a connector or circuit board).

Figure 10:
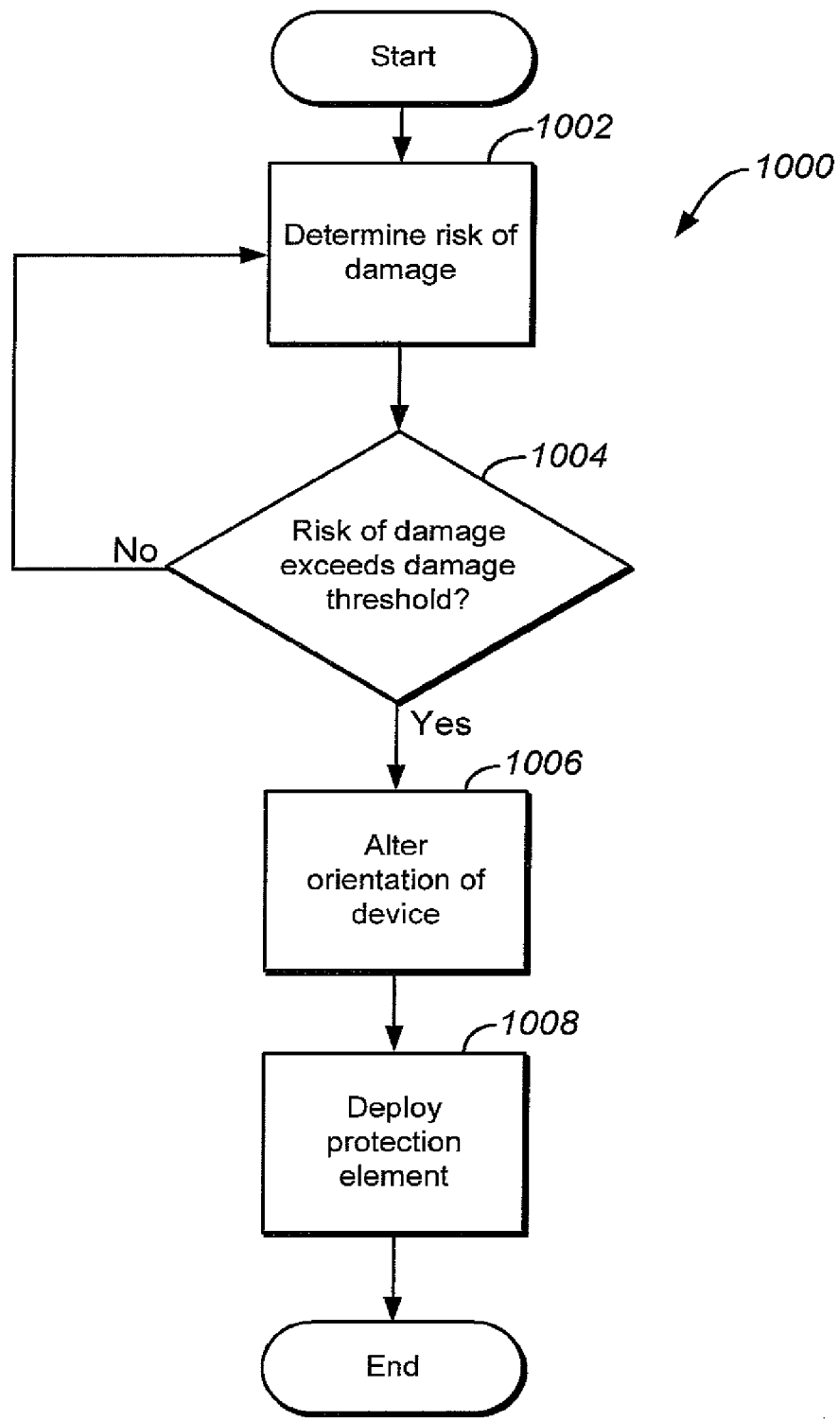
FIG. 10 is a flowchart illustrating a method for protecting a portable device.

FIG. 10 is a flowchart illustrating a method 1000 executed by damage avoidance system 102 for protecting a portable device 100 using safety monitoring system 104 and protection system 106, as described above. At step 1002, damage avoidance system 102 determines a risk of damage to the portable device 100. In some embodiments, damage avoidance system 102 periodically makes this determination. In other embodiments, damage avoidance system 102 continuously (e.g., real-time) makes this determination. For example, damage avoidance system 102 may utilize one or more of distance detector 108, motion detector 110, contact detector 112 and/or surface type detector 114 to determine the risk of damage to the portable device 100. Damage avoidance system 102 may weigh the information provided by each detector in safety monitoring system 104 differently when assessing a risk of damage.

At step 1004, damage avoidance system 102 determines whether a risk of damage to the portable device 100 exceeds a damage threshold. If the damage avoidance system 102 determines that a risk of damage does not exceed a damage threshold, the method 900 returns to step 1002. At a time after damage avoidance system 102 determines that a risk of damage to the portable device 100 exceeds a damage threshold, at step 1006 damage avoidance system 102 alters, if necessary, the orientation of the portable device 100. For example, if orientation detector 116 determines that the portable device 100 is already in a desired orientation (e.g., the protection element 120 will first impact the surface), then the portable device 100 is not reoriented prior to impact. If reorientation of the portable device 100 is required, reorientation element 118 alters the orientation of the portable device 100 one or more times prior to impact until the protection element 120 is positioned to first impact the surface. At step 1008, the protection element 120 may be deployed. The protection element 120 may be deployed before, during or after the reorientation of the portable device 100.

Figure 11:
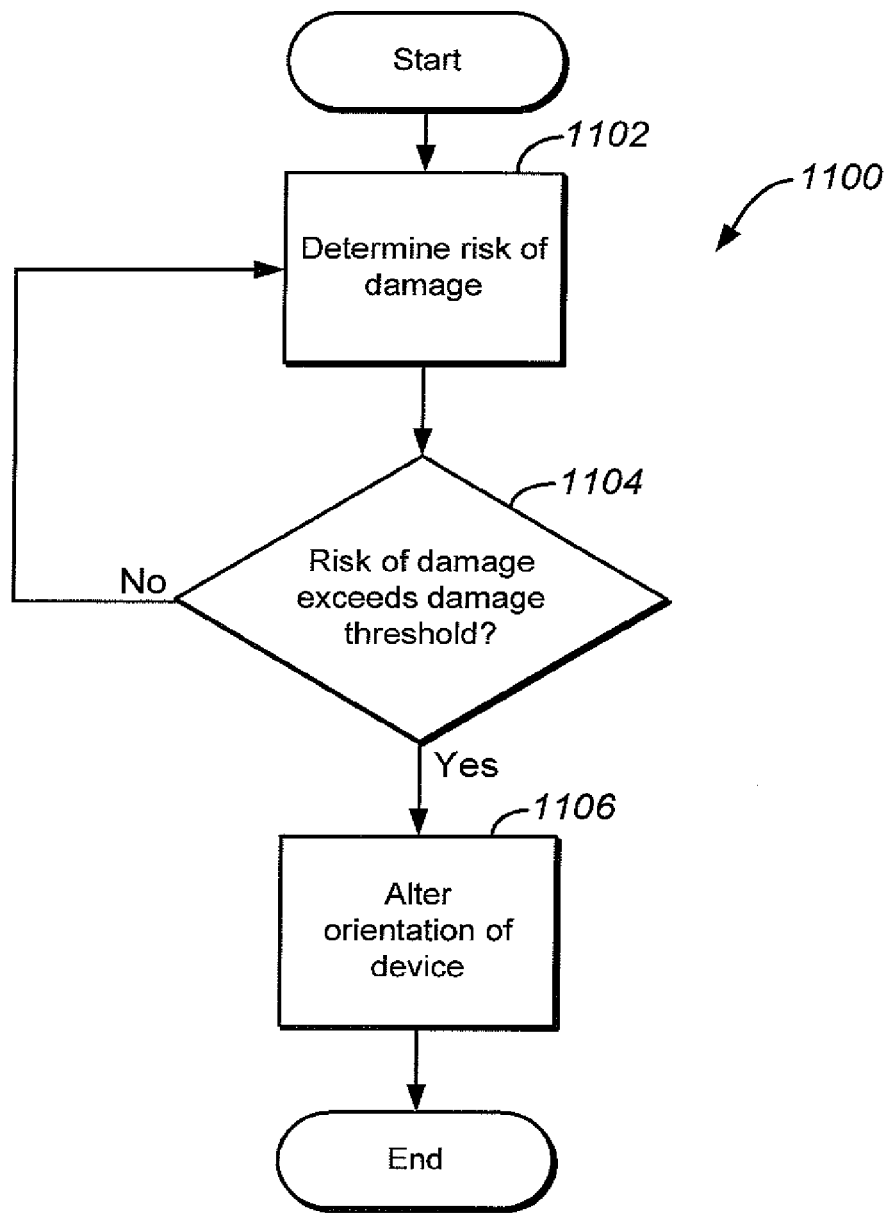
FIG. 11 is a flowchart illustrating an embodiment of a method for protecting a portable device.

FIG. 11 is a flowchart illustrating a method 1100 executed by damage avoidance system 102 for protecting a portable device 100 using safety monitoring system 104 and protection system 106. Steps 1102 and 1104 operate substantially as described above with respect to steps 1002 and 1004 of method 1000 to determine a risk of damage to the portable device 100 and to determine whether that risk exceeds a threshold. However, according to the embodiment of method 1100, a protection element 120 is not deployed. Rather, once it is determined that the risk of damage to the portable device 100 exceeds a threshold, at step 1106 the reorientation element 118 of protection system 106 alters the orientation of the portable device 100 to reduce or eliminate the risk of damage. For example, protection system 106 may be configured to reorient the portable device 100 such that a reinforced surface or a surface of the portable device 100 with a large surface area (relative to other surfaces of the portable device 100) first impacts the surface.

Figure 12:
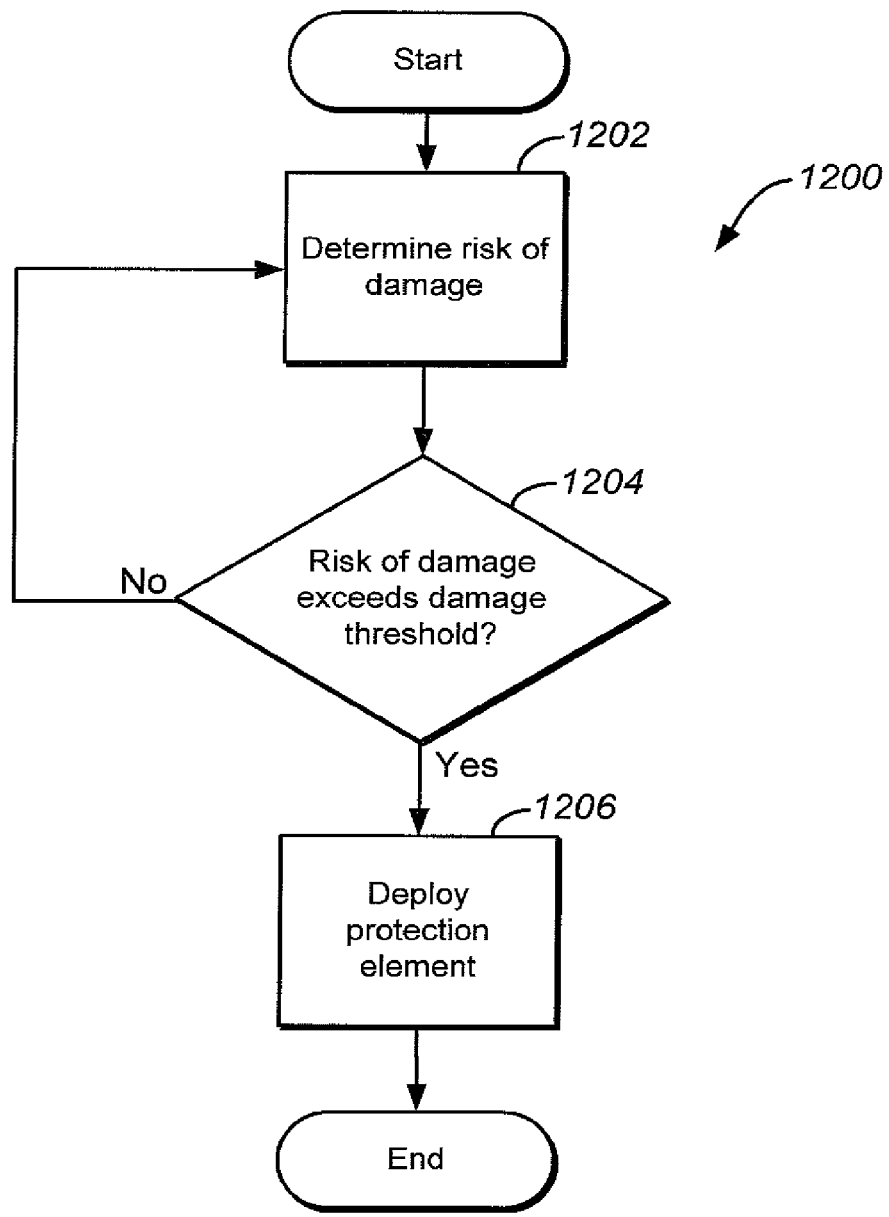
FIG. 12 is a flowchart illustrating another embodiment of a method for protecting a portable device.

FIG. 12 is a flowchart illustrating a method 1200 executed by damage avoidance system 102 for protecting a portable device 100 using safety monitoring system 104 and protection system 106. Steps 1202 and 1204 operate substantially as described above with respect to steps 1002 and 1004 of method 1000 to determine a risk of damage to the portable device 100 and to determine whether that risk exceeds a threshold. However, according to the embodiment of method 1200, the portable device 100 is not reoriented. Rather, once it is determined that the risk of damage to the portable device 100 exceeds a threshold, at step 1206 the protection system 106 deploys a protection element 120 (e.g. airbag, propulsion system, fans, springs, etc.) to reduce or eliminate the risk of damage. In such an embodiment it may be desirable to use a protection element 120 that protects substantially all surfaces of the portable device 100 from first contacting the impact surface. For example, an airbag that covers all or a substantial portion of the surface of the portable device 100 can be deployed. Additionally, in some embodiments, the protection element 120 may be deployed to protect a particular side of the portable device 100 that naturally tends to contact a surface first when dropped. For example, the center of mass of the portable device 100 may cause the device to impact on a particular side of the portable device 100 more often than others. In such a case, the protection element 120 may specifically be designed to deploy such that this particular side is protected.

In addition to helping to protect the portable device 100 from impact damage, damage avoidance system 102 may help locate a portable device 100 if it becomes lost or misplaced. In one embodiment, safety monitoring system 104 monitors at least one of movement and/or contact to determine if the portable device 104 is lost or misplaced. For example, after determining that the portable device (e.g., cell phone) has not moved or changed relative position for a defined period of time, damage avoidance system 104 may cause the portable device 104 to send a message. The message may be voice, text, SMS or other communication that informs the recipient that the portable devices may be lost/misplaced and may include location information, including for example the GPS coordinates from the portable device or a location based upon a triangulated signal. In one embodiment, at least one of motion detector 110 and/or contact detector 112 is used to determine motion and/or that the portable device 104 has been contacted (e.g., touched) the user within a defined or selected period of time. In addition, damage avoidance system 102, may also monitor the remaining battery operational life so that the portable device sends the communication before the portable device becomes non-operational because of an insufficient charge.

Although the portable devices examples generally typically refer to a cellular phone, the portable device may include smart phones, personal data assistants, electronic media players, electronic book readers, notebook computers, netbook computers, tablet computers, barcode scanners, cameras, video cameras, pagers, portable video game consoles, video game controllers and the like as each are susceptible to damage and/or loss.

All of the processes described herein may be embodied in, and fully automated via, software code modules executed by one or more general purpose or particular computers or processors. The code modules may be stored in any type of computer-readable medium or other computer storage device. Some or all of the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, the terms measures, measuring, ascertain, calculate, determine and determining are generally used interchangeably to convey that the described components, systems or methods operate to determine a particular result or condition.

Any process descriptions, elements or blocks in the flow diagrams described herein and/or depicted in the attached figures should be understood as potentially representing modules, segments or portions of code which include one or more executable instructions for implementing specific logical functions or elements in the process. Alternate implementations are included within the scope of the embodiments described herein in which elements or functions may be deleted, executed out of order from that shown or discussed, including substantially concurrently or in reverse order, depending on the functionality involved as would be understood by those skilled in the relevant art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A portable device protection system, comprising:
    a deployable protection element activated upon detection of a risk of damage to a portable device and configured to deploy prior to an impact with a surface, the deployable protection element located on a first protected side of the portable device; and
    a reorientation element, operable to determine prior to the impact that the portable device is likely to first impact with a second unprotected side of the portable device, and modify an orientation of the portable device by rotation such that upon impact the deployable protection element first impacts the surface.

2. The portable device protection system of claim 1, wherein the deployable protection element is removably attached to the portable device.

3. The portable device protection system of claim 1, wherein the detection of the risk of damage is received from the portable device.

4. The portable device protection system of claim 1, further comprising:
    a safety detection element configured to detect the risk of damage to the portable device from an impact.

5. The portable device protection system of claim 4, wherein the safety detection element is executed by a computing element of the portable device.

6. The portable device protection system of claim 4, wherein the safety detection element is further configured to determine if the portable device is lost or misplaced.

7. The portable device protection system of claim 6, wherein the safety detection element monitors at least one of a movement and a contact to determine if the portable device is lost or misplaced.

8. The portable device protection system of claim 6, wherein if the portable device is lost or misplaced, a location message is transmitted.

9. A portable device protection system, comprising:
    a protection element operable to reduce a risk of damage to a portable device caused by an impact with a surface, the protection element located on a first protected side of the portable device;
    an orientation detector operable to detect an orientation of the portable device; and
    a reorientation element, operable to determine prior to the impact that the portable device is likely to first impact with a second unprotected side of the portable device, and modify the orientation of the portable device by rotation such that upon impact the protection element first impacts the surface.

10. The portable device protection system of claim 9, wherein at least one of the protection element and the reorientation element includes a propulsion element.

11. The portable device protection system of claim 9, wherein the protection element comprises at least one of: an impact absorbing structure, a reinforced side, or a spring.

12. The portable device protection system of claim 11, wherein the portable device protection system is removably attached to the portable device.

13. The portable device protection system of claim 9, further comprising:
    a device safety monitoring system configured to detect the risk of damage to the portable device caused by impact with the surface.

14. The portable device protection system of claim 13, wherein the protection element is deployable and activated upon detection of the risk of damage by the device safety monitoring system exceeding a damage threshold, wherein the protection element is externally deployed from the portable device prior to impact with the surface.

15. A portable device protection system, comprising:
    a processor; and
    memory including instructions that, when executed by the processor, cause the portable device protection system to:
        detect at least one condition indicative of an impact with a surface;
        determine that a risk of damage to an unprotected portion of a portable device from the impact exceeds a damage threshold;
        alter an orientation of the portable device by rotation such that upon impact a deployable protection element first impacts the surface; and
        deploy the deployable protection element prior to impact with the surface.

16. The portable device protection system of claim 15, wherein altering the orientation is performed by a portable device reorientation element.

17. The portable device protection system of claim 16, further comprising at least one of: a propulsion element, an ejectable element, a movable weight, an actuator, a gyroscope, or a modifiable opening.

18. The portable device protection system of claim 16, wherein the portable device protection system reorients the portable device prior to deploying the deployable protection element.

19. The portable device protection system of claim 15, wherein the deployable protection element comprises at least one of: an airbag, a propulsion element, an impact absorbing structure, a reinforced side, or a spring.

20. The portable device protection system of claim 15, wherein the portable device protection system is removably attached to the portable device.

* * * * *